Feb. 16, 1954  L. LEE II  2,669,094
FUEL CONTROL APPARATUS FOR JET ENGINES
Filed Feb. 1, 1947  5 Sheets-Sheet 1
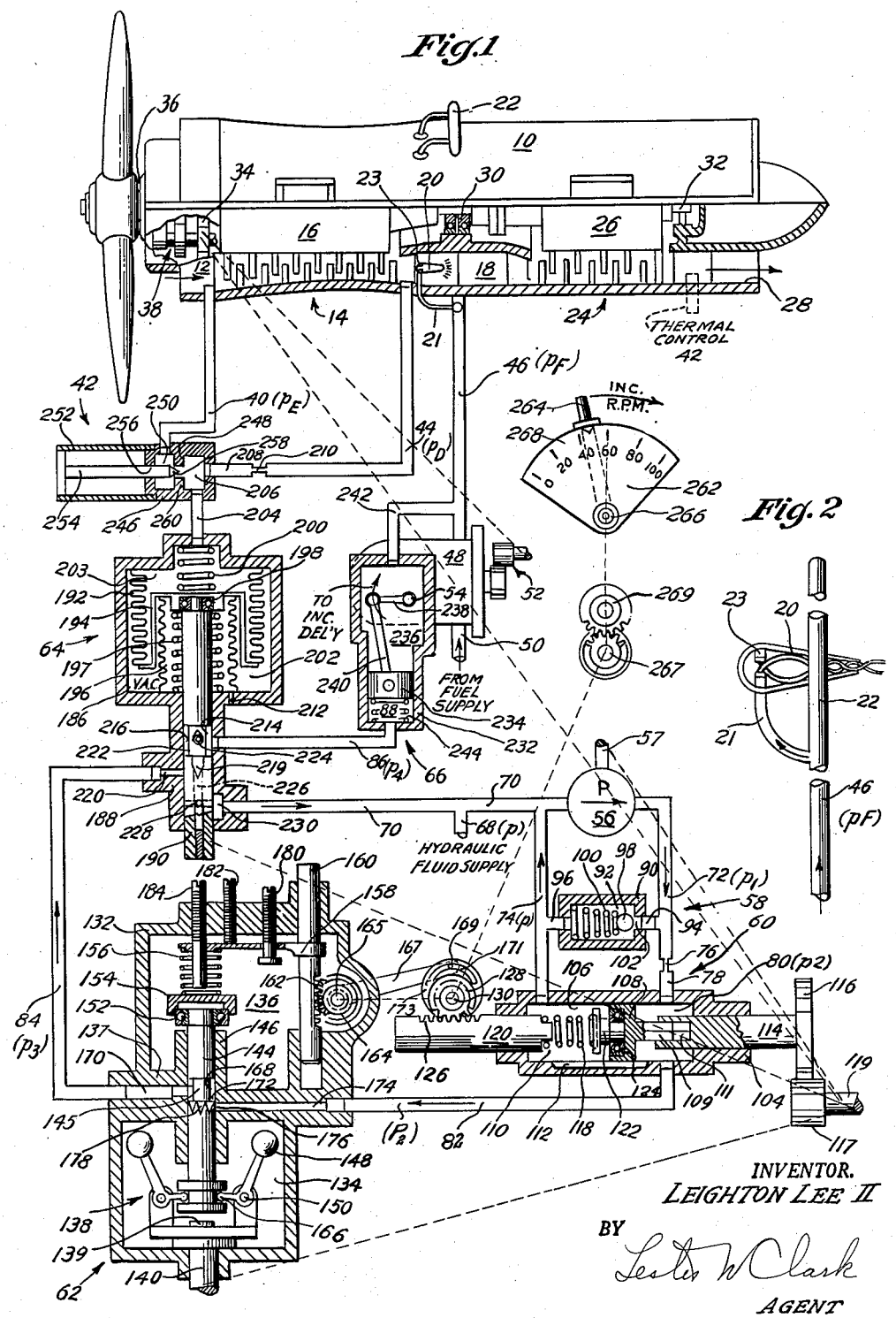
INVENTOR.
LEIGHTON LEE II
BY
Lester W Clark
AGENT Feb. 16, 1954           L. LEE II           2,669,094

FUEL CONTROL APPARATUS FOR JET ENGINES

Filed Feb. 1, 1947           5 Sheets-Sheet 2

INVENTOR.
LEIGHTON LEE II
BY
AGENT

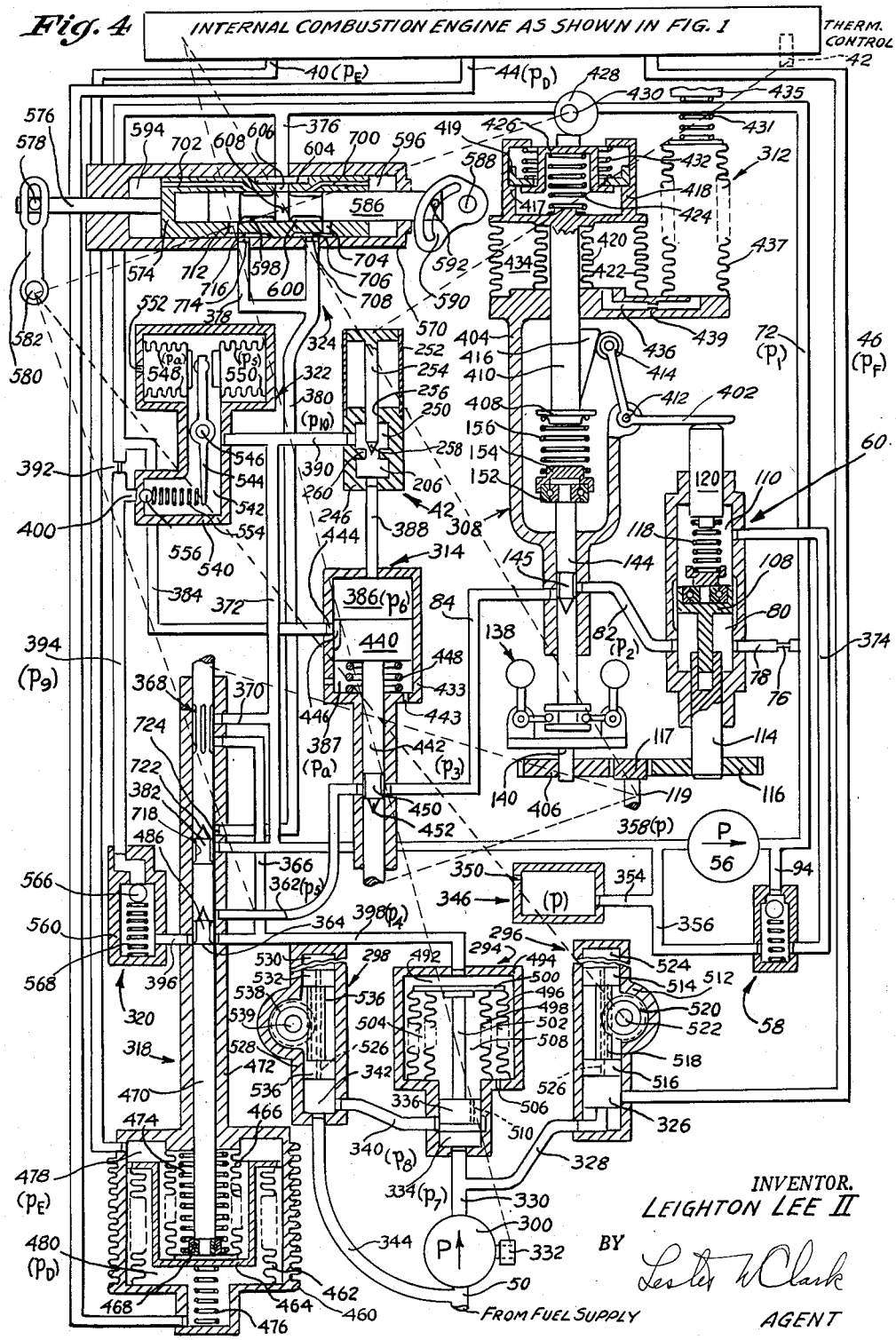

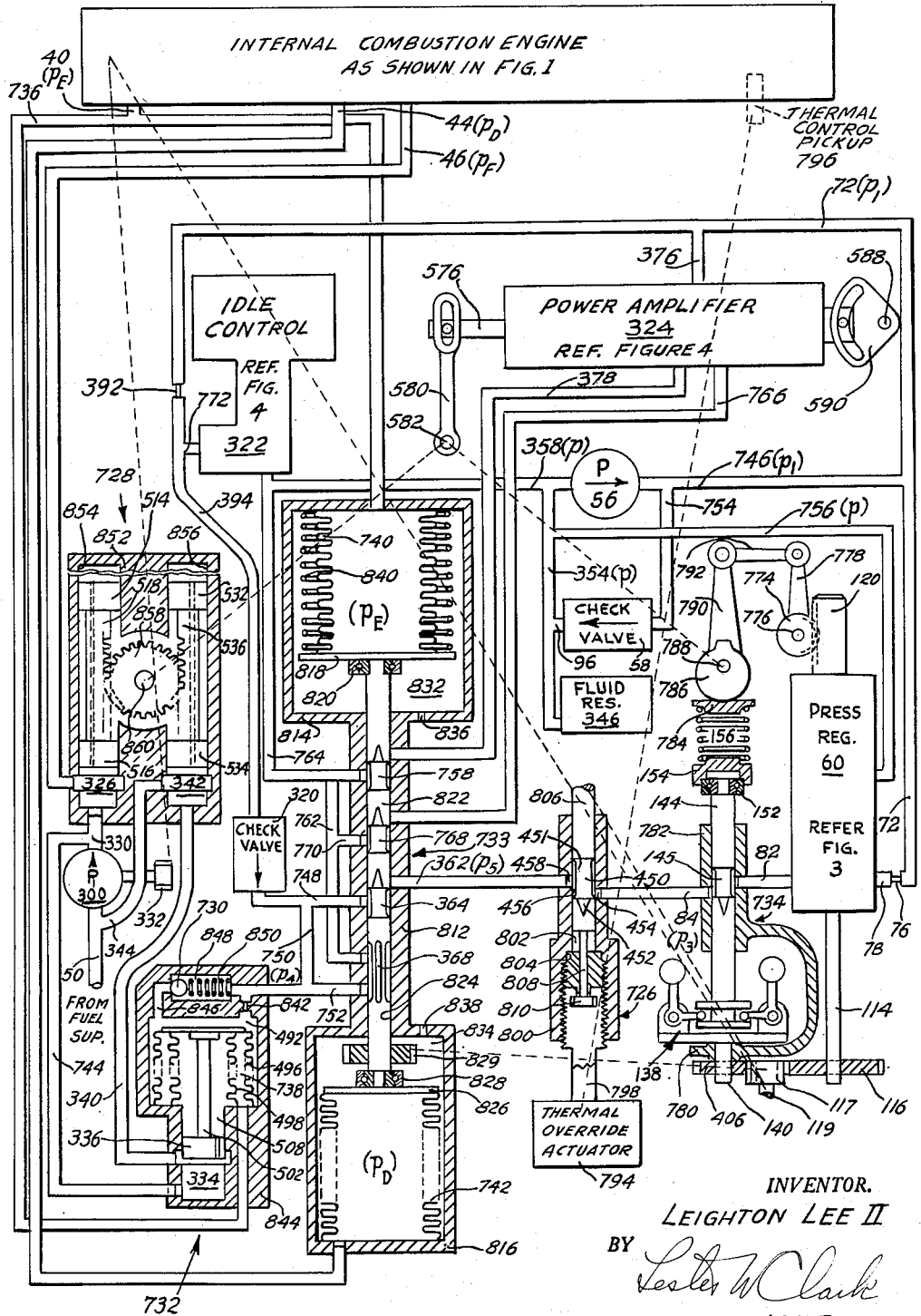

Feb. 16, 1954 L. LEE II 2,669,094
FUEL CONTROL APPARATUS FOR JET ENGINES
Filed Feb. 1, 1947 5 Sheets-Sheet 5
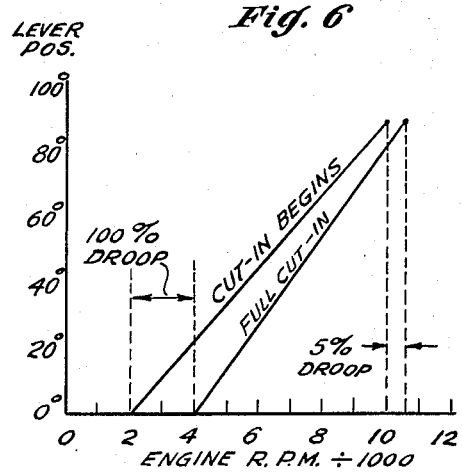
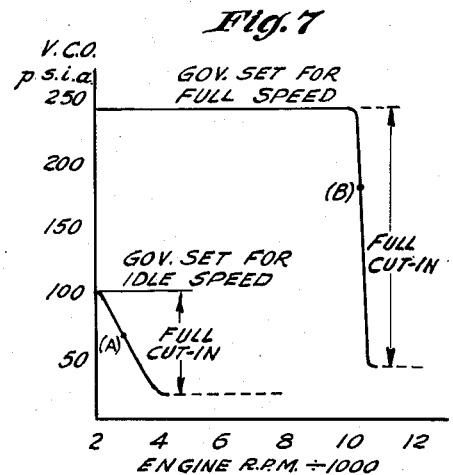
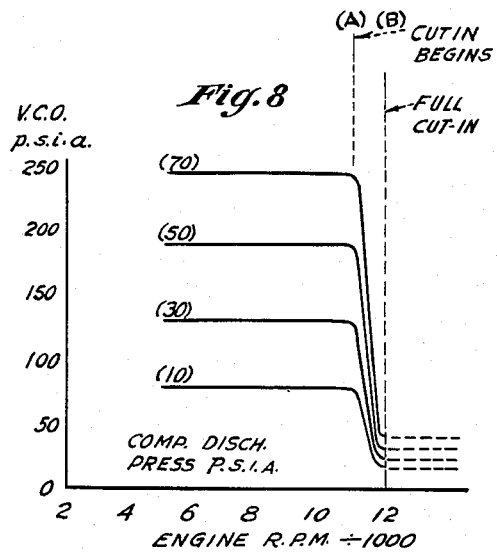
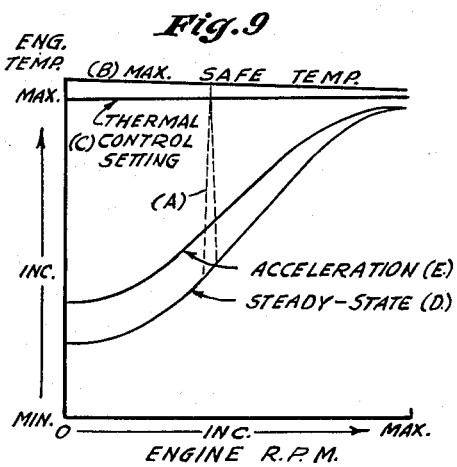
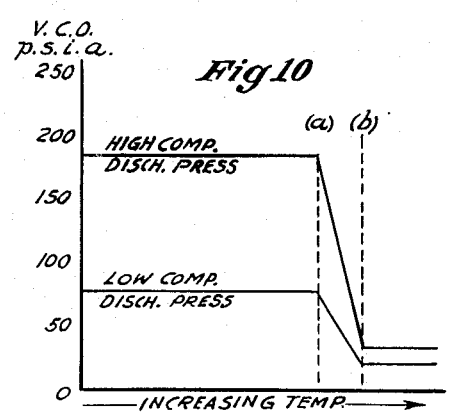
INVENTOR.
LEIGHTON LEE II
BY Lester W Clark
AGENT Patented Feb. 16, 1954

2,669,094

UNITED STATES PATENT OFFICE 2,669,094

FUEL CONTROL APPARATUS FOR JET ENGINES

Leighton Lee II, Rocky Hill, Conn., assignor to Niles-Bement-Pond Company, West Hartford, Conn., a corporation of New Jersey Application February 1, 1947, Serial No. 725,842

79 Claims. (Cl. 60—39.28)

This invention applies to fuel and speed control apparatus for internal combustion engines inclusive of gas turbine engines, jet engines, and combustion gas turbine-and-jet engines.

The particular embodiments of my invention, as shown and described herein, are intended for the control of fuel delivery to an engine suitable for propeller propulsion, jet-propulsion, or combined propeller-and-jet propulsion of aircraft. Such engines generally include an air inlet, an air compressor, one or more combustion chambers, a gas turbine and a tail pipe for discharging combustion gases to the atmosphere. Associated with the engine is a fuel pump for delivering fuel thereto, the claimed invention relating to apparatus for controlling the fuel pump delivery as a function of several variables including engine speed, engine temperature, other engine operating conditions, and manual control.

Both structural and metallurgical limitations prevent operation of an engine such as described at speeds or temperatures exceeding predetermined high values, and the engine is often normally operated at maximum allowable speed in order to avoid prohibitive sacrifice of power output. The engine speed is controllable as a function of fuel flow, and there may be included in the fuel system a governor mechanism responsive to the engine speed and effective to control the fuel flow to maintain a value of speed corresponding to the position of a lever controlled by the operator. In the embodiments shown and described herein, there is employed what is known as a droop-type speed governor mechanism, the characteristics of which are subsequently described.

Similarly, in order to obtain maximum power output, the engine temperature must be maintained at limiting or maximum allowable value also, but this is not generally done owing to the hazard involved and to the fact that response to engine temperature changes cannot be accomplished without lag. Normal engine temperature is somewhat less than the limiting temperature, the nearest approach to which occurs during acceleration.

When the engine is used for propeller-propulsion, the engine speed may be maintained at the maximum value and the fuel flow varied to correspond with variations in propeller pitch and hence with variations in engine torque and power output. In this case, the fuel flow variation allows the engine temperature to vary in a relatively wide range below the limiting temperature value, this type operation being more economical than is possible by allowing the speed to vary in order to obtain equivalent power. Normal engine operating conditions in turbine-propeller installations represent a wide range of engine speed, temperature, torque and other variables, however, all of which variables involve the necessity of providing suitable control of engine speed, and dependable means of avoiding both speeds and temperatures in excess of maximum allowable values.

When the engine is used for jet-propulsion only, the aircraft design, flight load, and other conditions are carefully taken into account to permit all possible operation at maximum allowable engine speed. With a single engine in use in a particular jet-propelled aircraft, engine speed is necessarily varied over a considerable range even though normal flight speed is maintained at a value determined by the maximum engine speed. With multiple jet engines, a pair of engines is preferably operated at maximum speed rather than allowing a greater number of engines to operate below maximum allowable speed. In jet-propulsion, there remains the necessity of providing suitable engine speed control and means for avoiding excessive speeds and temperatures. In all cases, the control of fuel flow affords means of controlling both the engine speed and temperature.

The maximum allowable engine speed depends on engine design, two different engines in current use having maximum speeds of approximately 7,000 and 13,000 R. P. M., respectively. Neither engine is self-operating below a starting speed to which it is accelerated by external means which ceases to drive the engine when self-operation of the latter occurs. The engines referred to have starting speeds approximating 3,000 and 8,000 R. P. M., respectively. Following starting and subsequent heating of the engine it may be "idled" at a speed approximating its starting speed, but unless the fuel flow is maintained at a value great enough to sustain "idling," the engine ceases to operate as a result of burner "blowout" and restarting by external means is necessary. Avoidance of undesired engine stoppage owing to attempted operation at prohibitively low speeds is a function of the fuel control apparatus.

Objects of my invention are:

(1) To provide improved hydraulic apparatus for the control of fuel flow to an internal combustion engine, so that fuel is delivered to the engine at a pressure which is in a predetermined fixed relationship with a variable control oil pressure in the apparatus and particularly to improve the apparatus shown and described in the copending application of Milton E. Chandler, Serial No. 664,412, filed April 23, 1946;

(2) To include in such apparatus improved means for regulating said hydraulic control pressure by means responsive to an engine operating condition which produces intermittent flow of hydraulic fluid in the apparatus;

(3) To provide in such apparatus improved means for controlling the fuel flow to the engine as a function of engine speed so that the sensitivity of response to speed changes is not unduly affected by the value of engine speed or other engine operating conditions;

(4) To include in such apparatus improved means for controlling idling fuel flow at a predetermined minimum value;

(5) To provide in such apparatus improved means for control thereof by a manually operated lever so that the lever is movable in response to a force of predetermined maximum value;

(6) To provide improved means rendering full response of such apparatus to manual control subject to predetermined time delay; and (7) To provide improved means in such apparatus for cutting off the flow of fuel to the engine.

Other objects and advantages of my invention will become apparent from a consideration of the appended specification, claims, and drawings, in which:

Figure 1 shows, somewhat diagrammatically, fuel and speed control apparatus embodying the principles of my invention, the principal elements of an internal combustion engine, and connections between the apparatus and the engine;

Figure 2 shows, somewhat diagrammatically, the fuel nozzle and manifold assembly of the engine of Figure 1 in relatively greater detail;

Figure 4 illustrates, somewhat diagrammatically, an embodiment of my invention similar to that of Figure 1 and an improvement thereof;

Figure 5 shows, also somewhat diagrammatically, another embodiment of my invention in which are employed certain improved or alternate forms of the elements of Figures 1 and 4;

Figure 3:
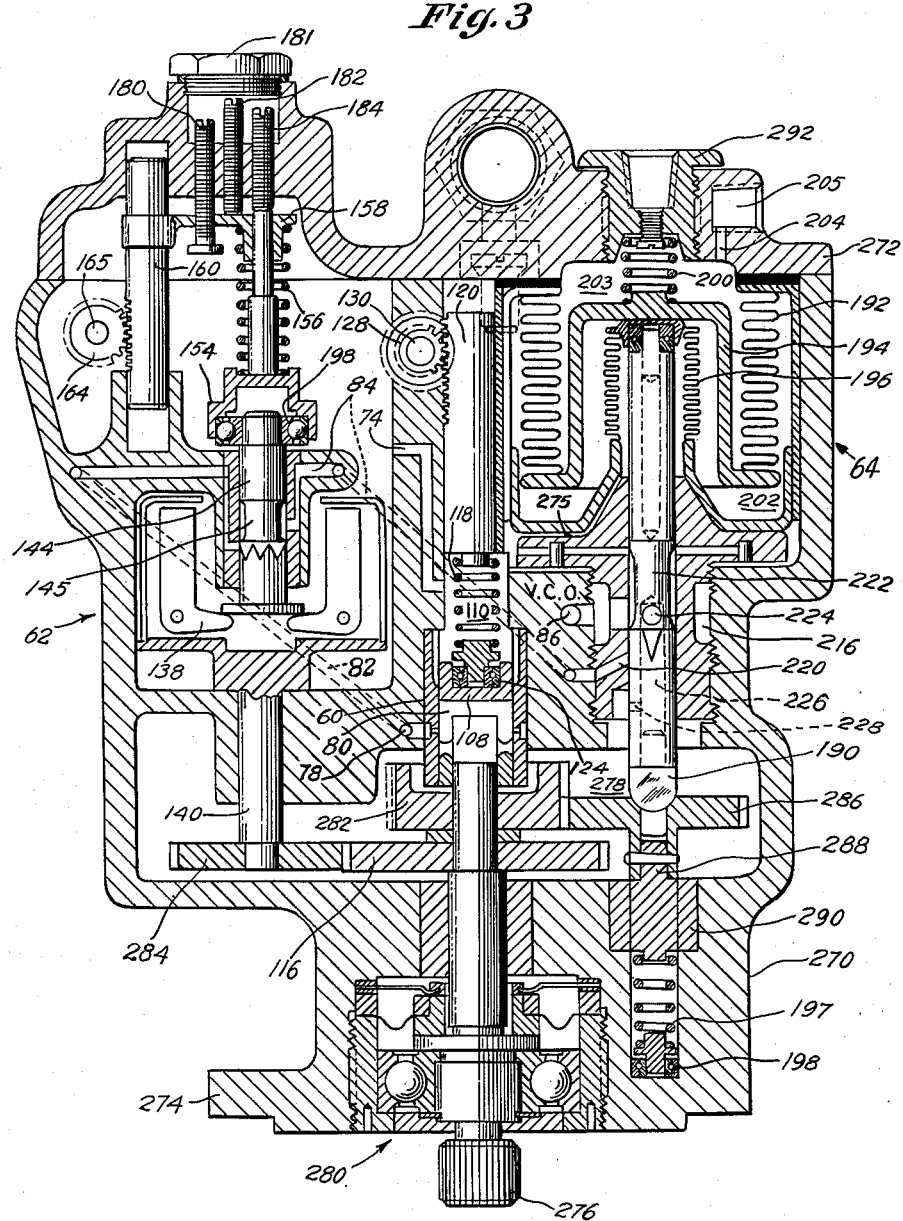
Figure 3 illustrates a cross-sectional view of the apparatus of Figure 1 substantially as built.

Figure 6 graphically illustrates the relationship between the manually operated control lever position and the engine speed, for conditions of engine over-speeding;

Figure 7 graphically illustrates the relationship between the variable control oil pressure produced by the apparatus and the engine speed, for comparative conditions at low and high speed;

Figure 8 also graphically illustrates the relationship of Figure 7, for varying values of the compressor discharge pressure;

Figure 9 graphically shows the relationship between engine temperature and speed, for comparative conditions of operation; and Figure 10 graphically shows the relationship between the variable control oil pressure and the engine temperature, for comparative low and high speed conditions of operation.

FIGURES 1 AND 2

Referring to the drawing, Figure 1, there are shown the principal elements of an internal combustion engine suitable for propeller-propulsion or propeller-and-jet propulsion of aircraft, as follows: a supporting casing 10, an air inlet 12, a multi-stage compressor 14, a compressor rotor 16, one each of a number of combustion chambers 18, one of a number of fuel discharge nozzles 20 connected to a generally circular manifold 22 by means of a conduit 21, a multi-stage turbine 24, a turbine rotor 26 connected to the compressor rotor 16, a tail pipe 28 for discharge of combustion gases from turbine 24, a center bearing 30 and end bearings 32 and 34 supported by casing 10, a propeller shaft 36, and a gear train 38 connecting shaft 36 to shaft 16.

A tube 40 is provided for transmission of the air inlet pressure ($p_E$) from the engine to a thermal control 42 in the fuel control apparatus, and a tube 44 is similarly provided for flow of air at the compressor discharge pressure ($p_D$) from the engine to the apparatus.

A main fuel conduit 46 conveys fuel to manifold 22 of the engine from a fuel pump 48 which is connected to an indicated source of supply by a fuel pump inlet conduit 50. Pump 48 is driven by the engine thru gearing 52 and includes delivery varying means operable by a shaft 54. It is the function of the apparatus to regulate the pressure ($p_F$) in conduit 46 and hence the fuel flow from nozzles 20.

The particular nozzles shown in Figure 1 and, in somewhat greater detail, in Figure 2, have a single set of fixed slots 23, two of which are shown in Figure 2. Fuel is supplied to each of the slots 23 in a manner which causes the fuel to be discharged from nozzles 20 as a swirling spray. Since the nozzle slots are fixed, the fuel flow varies as the square root of the differential between the pressure in conduit 46 and that in the nozzle, an extremely wide range of pressure variations being required therefore when the fuel flow is required to be increased from a relatively low to a high value. In order to avoid extremely high fuel pressures in conduit 46, some engines are provided with two manifolds and nozzles having two separate sets of fixed slots, one set of slots of each nozzle being connected to one manifold and the other set of slots of each nozzle being connected to the other manifold. There is then provided a wide-open flow connection between one manifold and the main fuel conduit corresponding to conduit 46 so that one set of slots in all the nozzles functions solely in response to the fuel control apparatus and the fuel pump. A flow divider is installed between the second manifold and the main fuel conduit, however, so that fuel is not permitted to flow from the second set of orifices in each nozzle until the pressure in the main fuel conduit exceeds a predetermined value, following which fuel is gradually supplied to the second manifold as the fuel pressure is increased. By this means, the necessity of otherwise increasing the fuel pressure as a squared function of the desired flow is avoided and the fuel pump and control apparatus may operate under most favorable conditions. In any case, regulation of the fuel pressure ($p_F$) in conduit 46 remains the function of the fuel control apparatus which is subject to relatively easily defined modification to suit use of one or two manifolds.

The rate of fuel flow to the engine and hence the engine speed are functions of the fuel pressure ($p_F$) in conduit 46, which is controlled by the delivery varying means connected to shaft 54. The fuel control apparatus operates shaft 54 so that in steady state operation the pump delivery always corresponds to a desired value of engine speed.

Principal elements of the fuel control apparatus of Figure 1 are in an hydraulic fluid pump 56, a check valve mechanism 58, a pressure regulator 60, a speed governor mechanism 62, a barometric control 64, and an hydraulic motor 66 connected to fuel pump 48. An engine driven shaft 119 is provided for rotating certain elements of the apparatus as hereinafter explained.

Fluid pump 56 is operated by a drive shaft 57 which is driven by shaft 119, as indicated, or by any other suitable means. Hydraulic fluid flows to pump 56 from an indicated source of supply at a pressure $(p)$ thru a supply conduit 68 and an inlet conduit 70. Fluid is discharged by pump 56 into a discharge conduit 72, a part of the fluid being by-passed to the pump inlet thru check valve mechanism 58 and a drain conduit 74 connected to inlet conduit 70, mechanism 58 maintaining a pressure $(p_1)$ upstream from a restriction 76 in conduit 72. Fluid flowing thru restriction 76 enters a conduit 78 connected to a chamber 80 in pressure regulator 60. Some of the fluid entering chamber 80 flows thru regulator 60 to conduit 74, the regulator 60 regulating a pressure $(p_2)$ in chamber 80 which has a value somewhat less than that of pressure $(p_1)$. The remaining fluid entering chamber 60 flows therefrom thru a conduit 82, speed governor mechanism 62, a conduit 84, and the barometric control 64 which is connected to conduit 70. The governor mechanism 62 and the barometric control 64 control the variable control oil pressure $(p_4)$ in a conduit 86 which is connected to a closed chamber 88 in motor 66. The pressure between mechanism 62 and control 64 in conduit 84 is designated $(p_3)$. Motor 66 varies the fuel flow in response to pressure $(p_4)$, which is sometimes referred to as the "V. C. O." pressure.

Manual control of the apparatus is provided by elements including a fixed quadrant 262, and an engine control lever 264 for operating a shaft 266 thru an arc corresponding to a calibrated scale 268 mounted on quadrant 262.

Check valve mechanism 58 comprises a body 90 having therein a chamber 92, the opposite ends of which are respectively connected to conduits 72 and 74 by conduits 94 and 96. A ball valve 98 is forced by a spring 100 toward a seat 102 in chamber 92 at the point of entry of conduit 94 into the chamber. Ball valve 98 controls the flow from conduit 94 thru mechanism 58 and conduit 96 to conduit 74. The force produced by spring 100 is substantially constant so that the pressure $(p_1)$ of fluid upstream from ball valve 98 is maintained at a substantially constant value.

Pressure regulator 60 comprises a regulator body 104 having therein a cylindrical valve guide 106 in which there is a piston valve 108 separating chamber 80 from another chamber 110, piston 108 being slidable in guide 106 to vary the effective area of flow thru a valve port 112 from chamber 80 to chamber 110. Valve 108 has a squared extension 109 which is slidable but not rotatable in a corresponding broached recess 111 in a shaft 114 with which extension 109 is engaged. Shaft 114 extends thru the right-hand end of body 104 and is rotated by a gear 116 driven by a gear 117 on a shaft 119 which is rotated by the engine. Valve 108 is thus both slidable and rotatable in guide 106, its rotation being provided to prevent sticking. A spring 118, in compression between one end of another shaft 120 and a spring support 122, tends to move the valve toward the right in opposition to the pressure $(p_2)$ in chamber 80. Spring support 122 rests on a ball bearing assembly 124 fixed in the left end of valve 108, bearing assembly 124 preventing rotation of support 122 in response to rotation of the valve and consequently preventing torsion due to the twisting of spring 118. Shaft 120 extends thru an aperture in the left end of body 104 and is provided with a toothed section 126 outside body 104 which engages a gear 128 mounted on a shaft 130 which is rotatable to move shaft 120 in a sense to increase or decrease the deflection and hence the force of spring 118 on valve 108.

The pressure regulator valve 108 is thus subject to a force proportional to the differential between the respective pressures $(p_2)$ and $(p)$ in chambers 80 and 110 which tends to move it leftward; and a force due to spring 118 which has a substantially constant value depending on the angular position of shaft 130. Valve 108 moves in guide 106 to maintain equilibrium of these forces, so that in steady state operation with the angular position of shaft 130 fixed the following relationship applies:

$$(p_2-p)=kS$$

in which (S) is the force of spring 118 and $(k)$ is a constant. In the embodiment shown, the value of $(p)$ may be considered substantially constant so that the pressure $(p_2)$ is therefore substantially constant. Shaft 130 is connected to shaft 266 thru a pair of gears 267 and 269 so that clockwise movement of control lever 264 moves shaft 120 toward the right and hence increases the value of the pressure $(p_2)$.

Both the volume and the pressure of fluid flowing thru the check valve mechanism 58 are subject to wider variations than the corresponding volume and pressure of fluid flowing past valve 108 in pressure regulator 60. Pressure regulator 60 is therefore of smaller capacity and of greater regulating accuracy than the mechanism 58.

Use of both the check valve mechanism 58 and pressure regulator 60 not only permits more accurate regulation of pressure $(p_2)$ but renders the apparatus better applicable to installations in which the fluid pump is remotely located in respect to the rest of the apparatus. A single valve could perform the functions of both mechanism 58 and regulator 60; but, if located at the pump, a long and complicated valve control mechanism would be required; and, if a single valve were located at the control apparatus, long highcapacity lines to the pump would be necessary.

Speed governor mechanism 62 has a housing 132 which contains a lower chamber 134 and an upper chamber 136 separated by a wall 137. A flyball speed responsive device 138 is mounted in chamber 134 and is driven by a shaft 140 which extends downward thru the lower end of housing 132, shaft 140 being rotatable in response to rotation of the engine driven shaft 119. The speed of shaft 140 is thereby maintained at a value proportional to engine speed. A valve shaft 144 is slidable in a guide 146 provided in wall 137 in response to movement of a pair of fly weights 148 in device 138 in reference to corresponding pivots 150, valve shaft 144 being at an extreme downward position when the engine is stopped and being subject to an increasing force tending to raise the shaft as the engine speed is increased.

The upper end of shaft 144 extends above guide 146 and has fixed thereto a ball bearing assembly 152 on the outer race of which is mounted a spring support 154. A governor spring 156 is in compression between support 154 and an arm 158 fixed to a shaft 160 in parallel with shaft 144 and slidable in housing 132 so that the central portion of the length of shaft 160 and arm 158 occupy a part of chamber 136. Shaft 160 has a toothed section 162 which engages a gear 164 mounted on a shaft 165. A lever 167 has one end fixed to shaft 165 and the other end provided with a pin 169 which engages a slot 171 in a cam 173 which is fixed to shaft 130, so that shaft 165 is operable by shaft 130 and hence by control lever 264. The angular position of shaft 165 determines the height of arm 158 which in turn determines the deflection of spring 156 and hence the downward spring force acting on valve shaft 144 in opposition to the upward force produced by the speed responsive device 138.

When valve shaft 144 is not stopped, the upward force produced by device 138 balances the downward spring force. When the engine speed is constant and the position of arm 158 is fixed, these forces are in equilibrium, the position of shaft 144 then being determined as a function of the engine speed, characteristics of device 138 and the value of the spring force. Speed governor mechanism 62 is controlled so that in all conditions of equilibrium the valve shaft has a substantially constant position, which is subsequently referred to as the equilibrium position of the valve. The deflection of spring 156 required to maintain the equilibrium position of the valve substantially constant as the engine speed is varied is made an approximate straight-line function of movement of lever 264. Quadrant 262 is then calibrated in terms of engine R. P. M., the scale values increasing from minimum to maximum in a clockwise direction corresponding to clockwise movement of lever 264, for varying the speed setting from minimum to maximum values, respectively. For any given setting of lever 264, the governor valve is in its equilibrium position whenever the speed is substantially constant at the value determined by the lever setting.

A pair of adjustable stops 180 and 182, respectively, are provided to limit the downward and upward travel of arm 158 and hence the angular movement of shaft 165. Stops 180 and 182 are effective to determine the maximum and minimum deflection of spring 156 corresponding to any given position of valve shaft 144. Hence stops 180 and 182 determine the maximum and minimum engine speeds respectively required to raise shaft 144 to the position of equilibrium. A third adjustable stop 184 is provided to limit upward travel of shaft 144 regardless of the engine speed or the setting of spring 156 by arm 158.

Rotation of shaft 140 is transmitted thru device 138 by means of fly weight levers 166 to valve shaft 144 so that shaft 144 is both slidable and rotatable in guide 146. The rotation of valve shaft 144 is provided not only to prevent sticking but as an essential requirement of "chopper" type valve construction, a form of which is provided in shaft 144. Valve shaft 144 has an undercut portion 168 of its length approximately at the center of guide 146. Conduit 84 enters a passage 170 in wall 133, passage 170 opening into the annular chamber 172 formed by undercut 168. Movement of shaft 144 does not vary the effective area of flow from chamber 172 to passage 170. Another passage 174 is connected to conduit 82 and opens at a port 176 in guide 146 approximately at the lower edge of undercut 168. A number of notches 178 is provided below the lower edge of undercut 168. Notches 178 are V-shaped in the embodiment shown and are deepest at the lower edge of undercut 168, tapering outwardly and downwardly to the periphery of shaft 144, the notch length being shown slightly greater than the diameter of port 76. The undercut 168, annular chamber 172, and notches 178 comprise a governor "chopper" valve 145. When notches 178 are opposite port 176, rotation of "chopper" valve 145 causes the notches to successively move past port 176, thereby permitting intermittent flow from port 176, thru notches 178, and into the annular chamber 172. Reference to "chopper" valves in this specification is thus explained to indicate a rotating valve providing intermittent flow between a pair of valve ports by means of one or more notches cut into a valve shaft, the shaft sometimes being undercut to form an annular chamber of which each notch forms an extension. Each notch permits flow from one port to the other past the valve during an interval of each revolution of the valve, the length of interval being determined by the speed of rotation and dimensions of the valve, notches and port.

The advantages of "chopper" type valve construction are more readily apparent when it is realized that the volume of fluid handled by valve 145 is small and that the effective area of flow past the valve is required to vary in predetermined relationship with the valve travel. If notches 178 where omitted from valve 145, port 176 would necessarily be precisely contoured and valved by the lower edge of undercut 168; or the undercut 168 would be tapered to correspond to requirements and a given form of port 176, or some combination of these two types of design would be necessary. In any case, however, even with utmost practicable precision, the desired dimensional accuracy of parts would be difficult or impossible to obtain, and the effective areas of flow corresponding to some or all positions of the valve would be undesirably small. With "chopper" type valve construction, on the other hand, since the flow is intermittent, there must be correspondingly greater effective flow area to permit the same flow as would occur with the previously described steady flow type valve. Thus with the same manufacturing precision, the dimensional accuracy of the "chopper" valve is improved, the possibility of flow stoppage by entrained dirt is decreased, and the notch or notches are relatively easily contoured to provide any desired relationship between valve travel and effective area of flow.

The barometric control 64 has a cylindrical casing 186 at its upper end. A valve guide 188 integral with casing 186 and extending downward therefrom is bored to permit slidable operation of a valve shaft 190 in guide 188, the upper end of shaft 190 extending into casing 186 at its approximate center. A bellows 192 is fixed inside casing 186 at its upper end and has an inverted cup 194 closing its lower end. Another bellows 196 has its upper and lower ends fixed to cup 194 and the lower end of casing 186, respectively. A ball bearing assembly 198 is fixed to cup 194 inside bellows 196 and at its upper end. The upper end of shaft 190 is connected to cup 194 thru bearing assembly 198 and is held against the cup by a spring 197. Another spring 200 is in compression between the top of the interior of casing 186 and the upper end of cup 194 so that vertical movement of either the valve or the bellows is transmitted to the other. The ball bearing assembly 198 permits rotation of shaft 190 without causing torsional stress in the bellows assembly. Shaft 190 has a connection with engine driven shaft 119, as indicated, but may be rotated by any other suitable means, if desired.

A chamber 202 formed inside casing 186 and outside bellows 192 and 196 is evacuated. A chamber 203 inside bellows 192 is connected by means of a conduit 204, thru an inlet chamber 206 in thermal control 42, another conduit 208, and a restriction 210 to conduit 40. Assuming that no flow occurs thru thermal control 42 from conduit 208 to conduit 40, the interior of bellows is subject to the compressor discharge pressure ($p_D$). The interior of bellows 196 is vented to atmosphere thru a vent 212 in the lower end of casing 186 and is therefore subject to absolute atmospheric pressure which produces a force tending to extend bellows 196 and to move shaft 190 upward. Bellows 196 serves primarily as a seal to prevent leakage into the evacuated chamber 202, however, and is of such small effective area that the upward force produced by it in response to the absolute atmospheric pressure is small. The principal control of vertical movement of valve shaft 190 is accomplished by bellows 192 which is normally subject to the absolute compressor discharge pressure and produces a force proportional thereto which tends to move shaft 190 downward, the force increasing as the compressor discharge pressure increases. The vertical position of shaft 190 is determined by the condition of equilibrium of forces produced by bellows 192 and 196 and by springs 197 and 200, which may be considered equivalent to a single spring having a rate equal to the sum of the rates of springs 197 and 200 in the following equilibrium equation:

$$p_D A' - p_a a' = S' + s't'$$

or $$t' = \frac{p_D A' - p_a a' + S'}{s'}$$

in which ($t'$) is the downward travel of valve shaft 190 from a predetermined initial position, ($A'$) and ($a'$) are the effective areas of bellows 192 and 197, respectively, ($S'$) is the net initial upward force of springs 197 and 200, and ($s'$) is the sum of the rates of the two springs. It is apparent that ($t'$) and hence the position of the valve is determined as a function of the variables ($p_D$) and ($p_a$), shaft 190 moving downward as the absolute discharge pressure ($p_D$) increases and also tending to move downward as the atmospheric pressure ($p_a$) inside bellows 196 decreases. As previously stated, the effect of bellows 196 is small and it is subsequently explained that at any given value of engine speed a decrease in atmospheric pressure ($p_a$) produces a net bellows force causing upward movement of shaft 190.

Valve shaft 190 has an undercut 214 forming an annular chamber 216 which is always connected by conduit 86 to chamber 88 in motor 66 regardless of the position of shaft 190 in its normal range of operation. A V-shaped notch 219 extending downward from undercut 214 is normally opposite a port 220 connected to conduit 84. The undercut 214, annular chamber 216, and notch 219 comprise a barometric "chopper" valve 222, the effective area of which varies in response to vertical movement of shaft 190. The barometric "chopper" valve 222 permits intermittent flow of fluid from conduit 84, thru port 220 and notch 219 into chamber 216 and thence thru conduit 86 to chamber 88 in motor 66. A multiplicity of notches 219 is employable if desired.

A small diametral passage 224 is provided in valve shaft 190 at the approximate center of undercut 214 and a centrally located longitudinal channel 226 is drilled from the lower end of the shaft to intersect passage 224. The lower end of channel 226 is then plugged. At least one diametral passage 228 intersecting channel 226 below passage 224 is provided opposite a recess 230 in guide 188, which recess is connected to conduit 70. Thus, when shaft 190 rotates in any vertical position thruout its normal range of movement, fluid may flow thru annular chamber 216, passage 224, channel 226 and passage 228 to recess 230 and conduit 70. Passage 228 and recess 230 function as a chopper valve to restrict the flow from chamber 216 to conduit 70.

The hydraulic motor 66 includes a body 232 enclosing therein a movable piston 234 separating chamber 88 from another chamber 236. Piston 234 is connected to shaft 54 by means of a lever 238 and a rod 240, so that motion of the piston 234 is transmitted to shaft 54. A conduit 242 connects chamber 236 to conduit 46. Piston 234 is subject to a downward force proportional to fuel pressure ($p_F$) in chamber 236 and an upward force similarly proportional to the variable control oil pressure ($p_4$) in chamber 88. A spring 244 biases piston 234 upwardly, the forces on piston 234 being in equilibrium when the following condition applies:

$$p_F A'' = p_4 A'' + S''$$

in which ($A''$) is the area of the piston, and ($S''$) is the load on spring 244 which decreases according to its rate and travel as piston 234 rises. If spring 244 were omitted, the fuel pressure ($p_F$) would be equal to the variable control oil pressure ($p_4$) since in the embodiment shown, as pressure ($p_4$) increases, piston 234 moves upward to turn shaft 54 in a delivery increasing direction until a state of equilibrium exists between forces acting on the piston. With spring 244, however, the fuel pressure ($p_F$) exceeds pressure ($p_4$) by an amount corresponding to the load ($S''$) of spring 244, which varies at a predetermined rate.

The maximum limiting temperature has a value which decreases slightly as the speed increases, there being an approximate straight line relationship between temperature and speed. When the engine is operating in substantially steady state condition, the normal engine temperature is less than the maximum limiting value, the differential between normal steady state temperature and the maximum limiting value decreasing as the speed increases corresponding to the increase in fuel flow as the speed increases. During acceleration, however, the temperature is higher than normal in respect to speed since fuel is being supplied to the engine at a greater rate than that normally corresponding to the engine speed, until acceleration ceases. Temperature characteristics of the engine are indicated in Figure 9 which is subsequently described.

Thermal control 42 comprises a body 246 having a wall 248 separating inlet chamber 206 from an outlet chamber 250 connected to conduit 40. One end of a thin-walled tube 252 is fixed to the closed end of body 246 nearest outlet chamber 250 and has attached to its other end, which is closed, a rod 254 which is slidable in a centrally located aperture 256 in the end of body 246 to which tube 252 is fixed. The free end of rod 254 is contoured to form a valve 258, which is operable in a seat 260 in wall 248. Tube 252 and rod 254 are made from materials having substantially different coefficients of thermal expansion and the unit is installed in the engine, as diagrammatically shown in dotted lines, with tube 252 exposed to the temperature of combustion gases in the tail pipe 28, or as may be otherwise desired. As the temperature increases, tube 252 expands faster than rod 254, thereby increasing the effective area of opening between valve 258 and seat 260. In the embodiment shown, control 42 is made so that the valve remains closed until a limiting value of temperature is exceeded.

While tube 252 of thermal control 42 is subject to engine temperature, the latter may vary at a sufficiently rapid rate to cause a time lag between actual temperature change and response of the thermal control owing to time required for the tube and rod to change temperature. Thus if the thermal control is set to permit opening of valve 258 at a predetermined value of temperature, in actual operation in which the temperature is increasing, the engine temperature will slightly exceed the predetermined value before the thermal control responds; and, in actual operation in which the temperature is decreasing, the engine temperature will fall below the predetermined value before the thermal control responds. The resulting differential between the respective values of increasing and decreasing engine temperatures at which the thermal control becomes effective is referred to as the temperature "droop" corresponding to the speed governor "droop" subsequently explained.

*Operation—Figure 1*

Included in the foregoing description of the structure of the embodiment shown in Figure 1 is a partial explanation of the function of each of the principal elements described. A more complete explanation of the coordinated operation of all elements of the apparatus follows.

In operation, pump 56 discharges fluid into conduit 72, the pressure ($p_1$) in which is maintained substantially constant by check valve mechanism 58.

From conduit 72, fluid flows thru fixed restriction 76 and conduit 78 to chamber 80 in pressure regulator 60, the pressure ($p_2$) in which is maintained substantially constant by regulator 60. The value of pressure ($p_2$) is variable between minimum and maximum limits in response to clockwise movement of the engine control lever 264, between extreme positions indicated by quadrant 262.

Fluid flows from chamber 80 in pressure regulator 60 at pressure ($p_2$) thru conduit 82 to the governor "chopper" valve 145 in speed governor mechanism 62 and thence into passage 170 and conduit 84. In the equilibrium position of valve 145 the lower edge of undercut 168 is slightly above the lower edge of port 176, thus slightly restricting the effective area of flow thru port 176, the amount of restriction at the equilibrium position of the valve approximating 10% in the embodiment shown. For any given setting of lever 264, the governor valve is in its equilibrium position whenever the speed is substantially constant at the value determined by the lever setting. When the engine speed is constant, fluid may flow from port 176, thru annular chamber 172 and passage 170 to conduit 84, subject to an approximate 10% restriction of the effective area of flow thru port 176. The differential ($p_2-p_3$) and hence the value of pressure ($p_3$) in conduit 84 depends not only upon the restriction of valve 145 but upon operation of the barometric control 64 and thermal control 42.

When the engine speed is less than that corresponding to the position of lever 264, and hence less than the speed required to move the governor "chopper" valve 145 upward to the equilibrium position, port 176 is opened wider and, when the speed is a predetermined amount below the setting speed, valve 145 moves downward to an extreme position at which the lower end of valve shaft 144 is in contact with a bearing 139 in device 138. Thus when the engine speed is slightly less than that corresponding to the position of lever 264, the pressure ($p_3$) in conduit 84 has a value which varies between the value of pressure ($p_2$) and approximately 90% of the value of pressure ($p_2$). When the engine speed decreases further, the pressure ($p_3$) is maintained equal to the pressure ($p_2$) and there is unrestricted fluid flow past the valve.

When the engine speed exceeds the value corresponding to the position of control lever 264, valve 145 is moved upward from its equilibrium position so that the lower edge of undercut 168 is further above the lower edge of port 176 and valve 145 further restricts the flow from port 176 to passage 170. The pressure ($p_3$) is then correspondingly less than the pressure ($p_2$).

The restriction across valve 145 results from the positional relationship of both the lower edge of undercut 168 and of notches 178 with port 176. As the speed continues to increase until all fluid flowing from port 176 is required to flow thru notches 178, valve 145 then functions entirely as a "chopper" valve, and the rate of change of flow thru the notches corresponding to speed changes or to vertical movement of valve shaft 144 is controlled by the number and respective contours of the notches.

The barometric "chopper" valve 222 in the barometric control 64 operates to vary the relationship between the variable control oil pressure ($p_4$) in conduit 86 and the pressure ($p_3$) in conduit 84 by varying the rate of flow from port 220, and thru notch 219, annular chamber 216, passage 224, channel 226, passage 228, and chamber 230 to conduit 70 at the relatively low pressure ($p$), principally in response to changes in the compressor discharge pressure ($p_D$). The pressure ($p_D$) varies as a function of engine speed, flight speed, altitude, and other conditions. Assuming that each of the other two named conditions is considered constant, then the compressor discharge pressure increases as the engine speed increases, increases as the flight speed increases, and decreases as the altitude increases or as the density of air in which flight occurs decreases. Notch 219 is therefore contoured so that the barometric control 64 varies the pressure ($p_4$) in conduit 86 as a function of engine speed to control acceleration, and also varies pressure ($p_4$) as a function of altitude changes.

*Case A.*—With air of minimum density at the air entrance 12 and with control lever 264 retarded to its extreme counterclockwise position, the pressure ($p_2$) in conduit 82 has a minimum value, the pressure ($p_3$) in conduit 84 has a minimum value approximately 10% less than the minimum value of pressure ($p_2$), the speed required to move the governor "chopper" valve 145 in governor mechanism 62 upward to its equilibrium position has a minimum value, the compressor discharge pressure ($p_D$) acting on the barometric control 64 has a minimum value and the variable control oil pressure ($p_4$) acting in motor 66 has a corresponding minimum value. Motor 66 therefore moves the delivery varying means associated with pump 48 to a position for minimum delivery.

The lever is necessarily slightly advanced in a clockwise direction from the extreme position assumed to one at which the respective values of setting speed, and of the pressures ($p_2$), ($p_3$) and ($p_4$) are sufficiently increased as explained in Case B to permit the engine to become operable. The case assumed above is purely hypothetical since minimum air density is dependent on both minimum flight speed and relatively high altitude.

*Case B.*—Assuming that the control lever is advanced in a clockwise direction to a position between zero and approximately eighty degrees such as is shown in the drawing, the sequence of events is substantially as follows: Shaft 130 causes gear 128 to move shaft 120 toward the right, thereby increasing the deflection of spring 118 and increasing the value of pressure ($p_2$) in conduit 82. Shaft 130 similarly causes gear 164 to move shaft 160 and arm 158 downward to increase the deflection of spring 156 so that valve shaft 144 and valve 145 are moved downward from their equilibrium position to maintain unrestricted flow of fluid across the valve so that the pressure ($p_3$) in conduit 84 increases to the increased value of pressure ($p_2$). The variable control oil pressure ($p_4$) in conduit 86 and in motor 66 increases, the fuel flow increases, and the engine speed and the compressor discharge pressure ($p_D$) increase, it being assumed that there is temporarily no change in the altitude or speed of flight. As the pressure ($p_D$) increases, the barometric control 64 responds by lowering shaft 190 to increase the effective area of flow thru notch 219 in the barometric "chopper" valve 222, and since the path of flow from chamber 216 to conduit 70 is constant, the pressure ($p_4$) increases and motor 66 increases the pump delivery. The engine speed consequently increases, the process being continuous as the pressure ($p_D$) increases, whereby the barometric control serves to control the rate of acceleration. As the engine speed approaches the value corresponding to the position of the control lever 264 the speed governor mechanism 62 begins to become effective or to "cut in," governor "cut-in" occurring when valve 145 in speed governor mechanism 62 just begins to restrict the effective area of flow thru port 176. The initial "cut-in" of governor "chopper" valve 145 produces relatively little reduction of the value of the pressure ($p_3$) and hence the fuel flow to the engine is only slightly reduced. At the low speed setting corresponding to the control lever position however, a small fuel flow change produces a relatively great speed change, so that the rate of acceleration is reduced at a correspondingly relatively high rate. As the engine speed approaches the value corresponding to the speed set by the control lever, its rate of acceleration is increasingly decreased, and when the desired engine speed is obtained, governor valve 145 is at its equilibrium position, pressure ($p_3$) is approximately 10% less than pressure ($p_2$), acceleration ceases, and steady state operation ensues.

When the control lever is fixed and the engine speed is substantially constant, as the pressure ($p_D$) increases corresponding to flight speed increase or altitude decrease, or both, the developed power increases and an increasingly greater amount of fuel is required to maintain the engine speed. The barometric control 64 responds by lowering shaft 190, as pressure ($p_D$) increases, thereby increasing the effective area of flow from port 220, past notch 219, and into chamber 216. The variable control oil pressure ($p_4$) is thereby increased and the fuel flow correspondingly increases to compensate the change in value of the compressor discharge pressure ($p_D$). A similar process takes place as pressure ($p_D$) decreases as altitude increases or as flight speed decreases. It is apparent therefore that barometric control 64 compensates changes affecting the total pressure of the air in entrance 12 of the engine and other changes affecting the value of the compressor discharge pressure ($p_D$) when the speed is constant, as well as serving as an acceleration control when the engine speed is varied as in Case B.

*Case C.*—In actual service, the conditions assumed in Case A do not apply since they imply zero flight speed at maximum flight altitude. We may assume therefore that in Case A the pressure ($p_D$) does not have a minimum value. The actual conditions and their effect on the apparatus in Case A may be inferred from the above explanation of Case C in which the engine is operating in a steady state condition obtaining with the control lever in the position shown, and altitude or flight speed conditions, or both, change to produce a corresponding change in compressor discharge pressure ($p_D$).

*Case D.*—Assuming that the engine speed exceeds the value corresponding to the position of control lever 264, governor mechanism 62 is immediately effective to raise valve 145 to further restrict flow from port 176 across the valve to conduit 86. Deceleration consequently occurs the converse of acceleration described in explanation of Case B, and valve 145 is restored to its equilibrium position at which there is steady state flow.

It has been previously explained that steady state operation at constant speed of any value occurs with the governor "chopper" valve 145 "cut-in" approximately 10%. Valve 145 is said to be in full "cut-in" position when it restricts the effective area of flow thru port 176 a maximum amount. The valve is not permitted to stop the flow thru port 176 entirely when in full "cut-in" position, since the variable control oil pressure ($p_4$) would then be reduced to a value equal to the value of the relatively low pressure ($p$), and the fuel pump delivery would be reduced to a minimum value. Combustion would consequently cease, or "burner blowout" would occur, and the engine could then be restarted only by being accelerated to starting speed by external means. At full "cut-in" therefore, provision is made to allow sufficient flow thru port 176 to permit idling the engine. The governor valve is said to be "cut-out" when it does not restrict flow thru port 176, and it is therefore just "cut-out" when the lower edge of undercut 168 is aligned with the lower edge of port 178.

The total speed change which occurs as the valve moves from "cut-out" to full "cut-in" positions is known as the governor "droop". The upward force on valve shaft 144 produced by device 138 is proportional to the square of its speed of rotation or R. P. M. Therefore, the same percentage change in speed from conditions of steady state operation at constant low and high speeds, respectively, results in a greater change in the value of the upward force at high speed than at low speed. With a helical spring of constant rate, such as spring 156 shown in the drawing, the same percentage change in speed from such conditions of steady state operation at constant low and high speeds, respectively, consequently results in a greater change of valve position and hence greater overspeed compensatory action of valve 145 at high speed than at low speed. It follows that in order to obtain identical compensatory valve movement from equilibrium position, when overspeeding occurs at low and high speeds, respectively, a smaller change of speed or less speed "droop" is required at high speed than at low speed. By definition, therefore, the percentage increase of speed occurring between initial "cut-in" and full "cut-in" of the governor is greater at low speeds. This is illustrated in Figure 6, which shows the relationship between the control lever setting and speed for comparative conditions of overspeeding at which initial and full cut-in occurs.

The effect on the motor pressure and hence on the fuel flow produced by governor valve "cut-in" is greater at high speed than at low speed, owing to the fact that at high speed the compressor discharge pressure is greater and the barometric "chopper" valve in control 64 is open farther. Figure 7 shows the relationship between the motor pressure and the engine speed for comparative conditions of full governor "cut-in" at idling and full speeds of the engine.

In addition to its function as an acceleration control, the barometric control 64 also serves the important purpose of reducing the governor "droop" as the flight altitude increases or the flight speed decreases. The effect of the barometric control in this respect is greatest at high speeds as shown in Figure 8 in which is illustrated the relationship between the motor pressure and the engine speed for comparative conditions in which the compressor discharge pressure varies from 70 to 10 p. s. i. absolute, corresponding to a decrease in altitude of flight or an equivalent condition.

In considering the matter of governor "cut-in," it is well to bear in mind that full "cut-in" never occurs as a result of overspeeding with the control lever fixed as for normal operation at a desired constant speed. Instead, full "cut-in" occurs when decelerating the engine and control lever 264 is retarded in a counterclockwise direction to a setting value of speed sufficiently less than the engine speed before movement of the lever to cause full governor "cut-in."

*Case E.*—When the position of control lever 264 is varied in the range approximately between 80° and 100° quadrant positions, the engine speed setting is unchanged, the value corresponding to the 80° quadrant position being the maximum allowable. Within this range, therefore, the lift of cam 173 and hence the angular position of shaft 165 remain constant. As the lever is moved from 80° to 100° positions, however, the movement of shaft 130 increases the deflection of spring 118 and hence increases the pressure ($p_2$). The fuel flow to the engine increases, therefore, and the power produced by the engine at constant maximum speed increases. In steady state operation at the approximate 100° lever position referred to, the engine operates at maximum speed and power, when the compressor discharge pressure has a maximum predetermined value.

*Case F.*—The maximum limiting temperature has a value which decreases slightly as the speed increases, there being an approximate straight line relationship between maximum limiting temperature and speed.

When the engine temperature increases so that thermal control valve 258 opens and flow of air occurs past the valve to chamber 250 and conduit 40, the pressure downstream from restriction 210 and the pressure in chamber 203 of the barometric control 64 therefore decrease and the barometric "chopper" valve is consequently moved upward corresponding to a decrease in the value of the compressor discharge pressure. The pressure ($p_4$) and the fuel flow to the engine are thus decreased. The fuel flow decrease results in lowered engine temperature and deceleration. When the temperature has fallen sufficiently, the thermal control valve 258 closes and normal operation follows with the pressure ($p_D$) again acting inside bellows 192. In the apparatus of Figure 1, the barometric "chopper" valve 222 serves the combined functions of acceleration control and altitude compensation as previously explained. In addition, along with the contour of valve 258 in the thermal control, the barometric "chopper" valve also determines the effect on the variable control oil pressure ($p_4$) of the thermal control valve opening. The effect produced at high values of the compressor discharge pressure is greater than that produced at low values, as indicated in Figure 10.

FIGURE 3

Referring to Figure 3, there is shown a cross-sectional view of the apparatus of Figure 1 substantially as built and used for fuel control to a jet engine.

The apparatus is enclosed in a main housing 270, having a housing cover 272 and a mounting flange 274 for installing the apparatus on the engine at a point where means are provided to operate a splined drive shaft 276 at a speed proportional to engine speed.

Corresponding to the apparatus of Figure 1, housing 270 serves as a reservoir from which hydraulic fluid is supplied to a pump, not shown, the pump being inside housing 270 and driven by shaft 276, or being located externally and operated by other suitable means. Hydraulic fluid flows from the pump thru conduit 78 into chamber 80 in pressure regulator 60. Some of the fluid is by-passed by valve 108, which is shown closed, to chamber 110 and thence to the reservoir thru drain conduit 74, the pressure ($p_2$) in chamber 80 thereby being regulated at a substantially constant value.

The remaining fluid flows thru conduit 82 to the speed governor mechanism 62 and past valve 145 on valve shaft 144 in mechanism 62 to conduit 84 the pressure ($p_3$) in which is controlled by the governor mechanism and barometric control 64.

From conduit 84 the fluid flows into port 220 and past the barometric "chopper" valve 222 on valve shaft 190. Some of the fluid is by-passed thru passage 224, channel 226, and passage 228, to a chamber 278 the pressure ($p$) in which is the same as in inlet conduit 70 of Figure 1. Conduit 86 is connected to the annular chamber 216 in shaft 190 for transmitting the variable control oil (V. C. O.) pressure to an external connection (not shown) which leads to the motor operated delivery varying means of the fuel pump corresponding to the structure of Figure 1.

Shaft 276 is connected thru a bearing and seal assembly 280 to regulator valve 108 which is therefore rotated as it slides in regulation of pressure ($p_2$), the value of which is determined by spring 118. Bearing assembly 124 is provided to prevent rotation of valve 108 from twisting spring 118. Shaft 120 is positioned by gear 128 on shaft 130 which is connected to the engine control lever 264 as shown in Figure 1.

Gear 116 mounted on shaft 276 engages a gear 284 mounted on shaft 140 for operation of device 138 in speed governor mechanism 62. Device 138 is therefore operated at a speed proportional to engine speed. The rotation of shaft 140 is transmitted to valve shaft 144 at the upper end of which bearing assembly 152 is provided to prevent the rotation of shaft 144 from tending to rotate spring 156. Spring 156 is in compression between support 154, resting on the outer race of bearing assembly 152, and arm 158 on shaft 160 which is positioned by movement of gear 164 on shaft 165 in response to movement of the engine control lever 264. Adjustable stops 122, 184, and 180 are provided as stated in connection with Figure 1 for determining the maximum and minimum height of arm 158 and for limiting the upward travel of valve shaft 144, respectively. Adjustable stops 180, 182 and 184 are accessible below a removable plug 181 in housing 270.

Another gear 282 is mounted on shaft 276 engaging a gear 286 for rotating shaft 190 and the barometric "chopper" valve 222. Gear 286 is attached to a stub shaft 288 which is slidable in a bearing 290 in relation to gear 282. A spring 197, supported by a bearing assembly 198, acts upwardly on shaft 288 and thereby tends to move shaft 190 upward. The location of spring 197 differs from that shown in Figure 1 but the function is the same. In Figure 3, however, spring 197 is allowed to rotate, the bearing assembly 198 insuring equal angular movement at both ends of the spring. Spring 200 is in compression between a removable plug 202 in cover 272 and cup 194 of bellows 192.

Vertical movement of shaft 190 and the barometric "chopper" valve 222 is controlled by bellows 192 and 196 in opposition to the net upward force of springs 197 and 200. Bellows chamber 202 is evacuated and chamber 203 is connected thru conduit 204 to an opening 285 to which a connection may be made with the thermal control in the engine, so that chamber 203 is maintained at the compressor discharge pressure at all temperatures below a predetermined limiting value. The pressure inside sealing bellows 196 is maintained the same as that inside housing 270 by means of a grooved channel 275. Bellows 196 is made of the smallest practicable area and the design may be modified, if desired, to include means for balancing forces on the sealing bellows so that pressure acting on the latter has no effect on operation of the control.

Operation of the apparatus of Figure 3 is essentially the same as that of Figure 1.

FIGURE 4

Referring to Figure 4, there is shown diagrammatically, the engine of Figure 1 connected to another embodiment of my invention having most of the features of the apparatus of Figure 1 and several additional features for providing improved performance and flexibility of control. Those elements in Figure 4 which correspond exactly to their counterparts in Figure 1 have been given the same reference numerals and will not be individually described in connection with the present figure.

The principal elements of the fuel system in apparatus of Figure 4 are a fuel pressure regulator 294, a fuel stop cock 296, a by-pass stop cock 298, all of which are directly associated with a fuel pump 300. The principal elements of the hydraulic system of the apparatus of Figure 4 are the hydraulic fluid pump 56, the check valve mechanism 58, the pressure regulator 60, a speed governor mechanism 308 including flyball speed responsive device 138 and a delayed-action mechanism 312, a thermal override mechanism 310 associated with thermal control 42, a barometric control 318, an idle check valve mechanism 320, an idle control 322, a power amplifier 324, and the fuel pressure regulator 294 which is part of both the fuel and the hydraulic systems.

Tubes 40 and 44, respectively, are provided for transmission of air from the engine at the compressor entrance pressure ($p_E$) and the compressor discharge pressure ($p_D$) to the barometric control 318.

Fuel discharged from pump 300 flows thru conduits 330 and 328, a chamber 326 in fuel cut-off valve mechanism 296 and thence thru conduit 46 to manifold 22 of the engine. Fuel pump 300 is driven by a gear 332 operated by the engine and supplies fuel to conduit 46 at pressure ($p_F$) from inlet conduit 50 which is connected to an indicated source of fuel. Fuel pressure regulator 294 is provided for regulating the value of pressure ($p_F$), when unrestricted flow occurs thru cocks 296 and 298, by by-passing some of the fuel delivered by pump 300 from conduit 330 thru a chamber 334 and past a valve 336 thru a conduit 340, a chamber 342 in by-pass stop cock 298 and into a return conduit 344 connected to inlet conduit 50.

The apparatus of Figure 4 employs what is referred to as a closed hydraulic system which includes a reservoir somewhat diagrammatically represented as 346. In design of the actual apparatus, reservoir 346 occupies a relatively small volume of the whole structure and is used for the dual purpose of supplying fluid to pump 56 thru conduits 354, 356, and 358 and for lubricating gears and other elements in a continuous oil bath. In the embodiment shown, the reservoir 346 is vented to atmosphere at 350 and the pressure ($p$) of fluid in reservoir 346 is therefore atmospheric. The invention is not so limited, however, since it may be desired to pressurize chamber 352 to render the control more flexible.

Fluid flows from pump 56 along a principal path including conduit 72, restriction 76, conduit 78, chamber 80 in pressure regulator 60, conduit 82, governor "chopper" valve 145 in speed governor mechanism 308, conduit 84, a thermal override chopper valve 450 in thermal override mechanism 314, a conduit 362, a barometric chopper valve 364 in barometric control 318, conduits 398 and 366, a restricting chopper valve 368, a conduit 370, and another conduit 372 connected to conduit 358, which returns the flow to the pump. Fluid also flows in a first supplementary path from conduit 72, thru conduit 94 and check valve mechanism 58, to conduit 356; and in a second supplementary path from chamber 98 in pressure regulator 60, past valve 108 into chamber 110 of the regulator, to a conduit 374 and thence to conduit 356. A third supplementary path for fluid flow from conduit 72 includes a conduit 376, power amplifier 324, conduits 378 and 380 and a chopper valve 382 in barometric control 318, to conduit 358. A fourth supplementary path of fluid flow from conduit 72 includes a conduit 384, a chamber 386 in thermal override mechanism 314, a conduit 388, thermal control 42, a conduit 390, and conduits 372 and 358. A fifth supplementary path for flow under certain conditions hereinafter specified from conduit 72 includes a restriction 392, a conduit 394, check valve mechanism 320, a conduit 396, barometric chopper valve 364, conduit 398, and conduit 366 in which it joins the principal path of flow. A sixth path includes conduit 394, a conduit 400, idle control 322, and conduits 390, 372, and 358. In all cases, the elements defining the respective paths of flow are stated in the order of flow.

Check valve mechanism 58, as described in connection with Figure 1, maintains the pressure ($p_1$) in conduit 72 at a substantially constant value.

Pressure regulator 60 is the same as the regulator 60 shown in Figure 1, except that the position of shaft 120 is controlled by a lever 402 the position of which therefore determines the value of the pressure ($p_2$) in chamber 80 and conduit 82. Pressure ($p_2$) is substantially constant when the position of lever 402 is constant. Shaft 114 is rotated by gear 116 driven by gear 117 on shaft 119 which is rotated by the engine so that valve 108 is both slidable and rotatable in guide 106.

Speed governor mechanism 308 includes a housing 404 and flyball speed responsive device 138 driven by shaft 140 on which there is a gear 406 driven by gear 117 at a speed proportional to the engine speed. Governor valve shaft 144 is slidable in housing 404 in response to device 138, tending to move farther upward as the speed is increased. The upper end of shaft 144 has fixed thereto ball bearing assembly 152 on which rests spring support 154. Governor spring 156 is in compression between support 154 and another spring support 408 fixed to a shaft 410 which extends slidably thru the upper end of housing 404 and is connected to the delayed-action mechanism 312, which cooperates with a cam 428 to control the deflection of spring 156 and hence the value of "cut-in" speed of governor chopper valve 145, as defined in connection with Figure 1.

Lever 402 is pivoted on a bearing 412 fixed in body 404 and has mounted at its upper end a roller 414 which engages a contoured cam plate 416 fixed to shaft 410, so that movement of shaft 410 causes movement of shaft 120 in pressure regulator 60, the contour of plate 416 determining the relative movements of the two shafts.

In the embodiment shown in Figure 4, the delayed-action mechanism 312 includes a flanged support 418 fixed to the upper end of shaft 410. A pair of bellows 420 and 422 is mounted between support 418 and housing 404, bellows 420 being inside bellows 422 and serving as a seal for shaft 410. A spring 424 is in compression between support 418 and an inverted flanged cup 426 the position of which is determined by cam 428 which is mounted on a shaft 430, so that angular movement of shaft 430 varies the deflection of spring 424 which tends to move shaft 410 downward in opposition to bellows 420 and 422. Another spring 432 is in compression between support 418 and the lower flanged end of a retainer 419 which is slidable in the upper end of support 418, the latter being provided with a step 417 to limit downward movement of retainer 419, as shown in the drawing. A chamber 434 inside bellows 422 has a connection 436, containing a restriction 439, with the interior of a third bellows 437 fixed to an extended portion of the upper end of housing 404. A spring 431 is compressed between the upper closed end of bellows 437 and a fixed support 435. Chamber 434, connection 436, and the interior of bellows 437 form a closed system, which is filled with a liquid of low vapor pressure and substantially constant viscosity. In steady state operation, the downward force of spring 432 is greater than the upward force of spring 424. The mechanism is in equilibrium when the respective positions of shaft 430 and cam 428 are fixed, the pressure in chamber 434 is the same as that inside bellows 437, and retainer 419 is engaged with cup 426, as shown in the drawing. On rapid movement of shaft 430 so that cam 428 moves cup 426 downward and out of engagement with retainer 419, spring 424 is compressed. The increased spring load forces flanged support 418 and shaft 410 downward in opposition to the pressure in chamber 434. The pressure in chamber 434 exceeds the pressure inside bellows 437 until flow from chamber 434 thru connection 436 and restriction 439 increases the pressure in bellows 437 to a value at which equilibrium is restored. During this process the pressure in chamber 434 decreases and bellows 420 and 422 contract so that support 418 moves downward to restore engagement of retainer 419 with cup 426. Positioning of shaft 410 in response to movement of cam 428 is thus delayed and an abrupt change in the deflection of spring 156 and consequently in the position of the governor chopper valve 145 is prevented.

Similarly, when shaft 430 is rapidly moved so that the lift of cam 428 decreases, cup 426 moves upwardly, the load on spring 424 is correspondingly decreased, and the pressure in chamber 434 remains less than that inside bellows 437 until flow thru restriction 439 restores equilibrium. In this process, cup 426 remains in engagement with retainer 419 which is temporarily raised off the step 417 until gradual expansion of bellows 420 and 422 raises flange 418 and thereby causes the retainer 419 to become seated on step 417 corresponding to a new condition of equilibrium.

It is thus apparent that both acceleration and deceleration are accomplished with springs 424 and 432 balancing each other, while in steady state operation these springs do not affect deflection of spring 156.

Structurally, thermal control 42 differs from the control 42 of Figure 1 only in respect to one conduit connection to the control in which respect the two controls may be made identical, if desired. The control in Figure 4, however, valves hydraulic fluid instead of air as in the thermal control of Figure 1. Conduit 388 is connected to inlet chamber 206 and conduit 390 is connected to outlet chamber 250. The control is mounted on the engine so as to be subject to the engine temperature, as diagrammatically shown in Figure 1 where the control is subject to the engine tail pipe temperature. A path for flow of fluid thru control 42 is provided from conduit 388, thru chamber 206, past valve 258 and thru chamber 250 to conduit 390. Valve 258 normally is on seat 260, however, so that there is no flow through the control until the temperature exceeds a predetermined value. Then, valve 258 is lifted off the seat, the effective area of flow past the valve increasing as the temperature increases above the predetermined value.

The thermal override mechanism 314 is controlled by thermal control 42. Mechanism 314 has a generally cylindrical body 433, the upper portion of which is of greater diameter than the lower end. Inside the enlarged upper portion of body 433 a piston 440 is slidably operable, piston 440 being fixed to a valve shaft 442 which extends downward from piston 440 and slidably thru the lower bored end of body 433, shaft 442 being rotated thru a connection from shaft 119. Piston 440 separates an upper chamber 386 from a lower chamber 387 which is vented to atmospheric pressure ($p_a$) at a vent 443. The pressure in chamber 386 is referred to as the "thermal oil" pressure and is designated ($p_6$). A port 444 provided at the end of conduit 384 is valved by a vertical "chopper" valve slot 446 in the upper end of piston 440. When valve 258 in thermal control 42 is closed, fluid pressure ($p_1$) is transmitted from conduit 384, thru port 444 and slot 446 to chamber 386 and hence to the top of piston 440 which is consequently forced downward with a force proportional to the thermal oil pressure which, in this case, equals the gage pressure ($p_1$). Opposing this downward force is the upward force of a spring 448 compressed between the respective lower ends of piston 440 and chamber 387. When thus moved downward in normal operation at temperature less than the predetermined value at which valve 258 opens, the thermal "chopper" valve 450 is positioned so that fluid may flow unrestrictedly from conduit 84, at pressure ($p_3$), to conduit 362 in which the pressure is also ($p_3$) in operation at normal temperature.

When the predetermined limiting temperature is exceeded and valve 258 in thermal control 42 opens, fluid flows from chamber 386 to the thermal control, the flow being restricted by slot 446 so that the thermal oil pressure ($p_6$) in chamber 386 decreases. Valve 258 and slot 446 are contoured to produce a desired change in the value of the thermal oil pressure ($p_6$) in chamber 386, and hence a desired rate of rise of piston 440 corresponding to the engine temperature increase to which thermal control 42 is subject. Similarly, the thermal chopper valve 450, which includes at least one notch 452, is made so that flow from conduit 84 to conduit 362, and hence the pressure ($p_5$) in conduit 362, is varied in a predetermined relationship with the variation in engine temperature in a narrow range above the value at which thermal control valve 258 begins to open.

Thermal control 42 is not necessarily limited to the type shown, since any control producing equivalent results is suitable and it is desirable to employ a control which operates with minimum time lag in response to increasing or decreasing engine temperatures.

The barometric control 318 includes a cylindrical finned casing 460 at the lower end inside which is mounted a bellows 462 which has an inverted cup 464 fixed to its upper end. A seal bellows 466 has its upper and lower ends respectively fixed to the upper end of the interior of casing 460 and to the lower end of cup 464 so that bellows 462 and 466 and cup 464 are subject to the same vertical movement. A ball bearing assembly 468 is fixed inside the lower end of bellows 466. A valve shaft 470 extends upward and slidably thru a valve guide 472 formed by an extension of casing 460, and has its lower end supported by the inner race of bearing assembly 468, the valve shaft being connected to the bearing assembly so that it is responsive to vertical movement of bellows 462 and 466 and independently rotatable in guide 472. Valve shaft 470 extends upwardly beyond guide 472 and is connected to shaft 119 for rotation by the engine; other means of rotation may be employed if desired. A spring 474 is compressed inside bellows 466 and another spring 476 is compressed between the lower end of cup 464 and the lower end of casing 460. A chamber 478 formed inside casing 460 and outside bellows 462 is connected to conduit 40 and is therefore subject to the pressure ($p_E$). Similarly, a chamber 480 inside bellows 462 is connected to conduit 44 and is subject to the compressor discharge pressure ($p_D$). The barometric control 318 of Figure 4 is responsive to the pressure differential ($p_D$) − ($p_E$) rather than to the absolute discharge pressure as is the corresponding control 64 of Figure 1. The position of valve shaft 470 in guide 472 therefore is principally a function of the pressure differential, the effect of the pressure ($p_E$) on seal bellows 466 being relatively small. The pressure differential ($p_D$ − $p_E$) varies in the same sense as the absolute discharge pressure ($p_D$) in response to engine speed, altitude, speed of flight, and other changes as explained in connection with Figure 1, there being differences of both value and the rate of change of values of the differential and the absolute pressure which are accounted for in design and which produce slightly different engine performance.

The barometric "chopper" valve 364 comprises an undercut in shaft 470, an annular chamber formed by the undercut, and a notch 486 at the top of undercut. Valve 364 controls the flow of fluid from conduit 362, thru an annular chamber 484 to conduits 398 and 356. Notch 486 is contoured so that the barometric chopper valve 364 serves to control both the rate of acceleration, the character of altitude compensation, and to reduce the speed governor "droop" at altitude, as has been explained in reference to Figure 1. The pressure ($p_4$) in conduit 398 is referred to as the V. C. O. or variable control oil pressure, which is transmitted thru conduit 398 to a chamber 492 in the fuel pressure regulator 294 for regulating the pressure ($p_F$) of fuel delivered to the engine.

The restricting chopper valve 368 serves only to restrict the flow from conduit 366 to conduits 370 and 358, and consists of a number of vertical chopper slots in shaft 470 which, at any given speed, maintains a constant effective area of flow from conduit 366 past valve 368 to conduit 370 regardless of the vertical position of valve shaft 470.

Fuel pressure regulator 294 has a generally cylindrical casing 494, the diameter of the upper portion of which is somewhat greater than that of the lower portion in which piston valve 336 is slidably operable. A pair of bellows 496 and 498 has its respective lower and upper ends fixed inside casing 494 to the lower end of the upper portion of the casing and to a plate 500 which is movable in response to flexure of the bellows. Piston valve 334 is connected to plate 500 by a rod 502 so that the piston is also responsive to movement of the bellows. There is a chamber 504 between bellows 496 and 498 made subject to atmospheric pressure ($p_a$) by provision of a vent 506. Piston 336 separates chamber 334 from a chamber 508 inside bellows 498, the pressure ($p_1$) in which is maintained equal to that in chamber 334 by means of a channel 510 in piston 336.

Fuel pressure regulator 294 is in equilibrium when the following equation of forces apply:

$$p_4 A''' = p_a (A''' - a''') + p_1 a'''$$

in which (A''') and (a''') are the respective areas of bellows 496 and 498. From the above it is seen that:

$$p_4 = p_a - \frac{a''' p_a}{A'''} + p_7 \frac{a'''}{A'''}$$

or $$p_4(\text{GAGE}) = \frac{a'''}{A'''} p_7(\text{GAGE})$$

whence it follows that the piston 336 controls the flow from the pump 300, thru conduit 330, and chamber 334 to conduit 340, in response to the variable control oil (V. C. O.) pressure ($p_4$) in chamber 492, so that the fuel pressure ($p_7$) in chamber 334 and conduits 330 and 328 is in a constant relationship with the value of pressure $p_4$) depending upon the respective areas of bellows 496 and 498.

The fuel stop cock 296 comprises a body 512 bored to permit slidable operation therein of a pair of pistons 514 and 516 connected by a toothed shaft 518. Chamber 326 is connected to another chamber 524 above piston 514 by a channel 526 so that the pressure ($p_7$) is transmitted to chamber 524. Shaft 518 is engaged by a gear 520 mounted on a shaft 522 rotatable in body 512, angular motion of shaft 522 between extreme clockwise and counterclockwise positions moving piston 516 from an extreme upward to an extreme downward position. In its upward position, piston 516 permits unrestricted flow from chamber 326 to conduit 46 so that the pressure ($p_F$) in conduit 46 equals the pressure ($p_7$) in chamber 326 and is therefore proportional to the value of the variable control oil pressure ($p_4$). In its downward position, piston 516 blocks the flow from chamber 326 to conduit 46 so that fuel flow to the engine is cut off and pressure ($p_F$) becomes zero. Meanwhile, pressure ($p_7$) in chamber 334 continues to be regulated as a function of pressure ($p_4$). Shaft 522 may be set at any desired angular position so that the fuel pressure ($p_F$) is subject to control at any desired value less than that of pressure ($p_7$).

The by-pass stop cock 298 is substantially the same as stop cock 296 in all structural details. Stop cock 298 includes a body 528 bored for slidable operation therein of a pair of pistons 532 and 534 connected by a toothed shaft 536. Chamber 342 is connected to another chamber 530 above piston 514 by a channel 527. Piston 534 is movable in response to rotation of a gear 538 mounted on a shaft 539 in body 528. When shaft 439 is in its extreme counterclockwise position, piston 534 is moved upward to permit unrestricted flow from conduit 340 thru chamber 342 to conduit 344 so that the pressure ($p_8$) in conduit 340 is the same as that at the inlet to pump 300. When shaft 539 is in its extreme clockwise position, piston 534 is moved downward to block flow from conduit 340 to chamber 342 so that regardless of the position of stop cock 296, the pressure ($p_F$) in conduit 46 is the full pressure producible by pump 300 and the fuel flow is not controlled by regulator 294. In intermediate positions of shaft 539 and piston 534 the value of the pressure ($p_8$) is variable between the respective pump inlet and discharge pressures, thereby rendering the apparatus subject to control so that the fuel pressure ($p_F$) is any desired value greater than that normally produced as a function of the variable control oil pressure ($p_4$) acting on fuel pressure regulator 294.

The idle control 322 includes a housing 540 having therein a fluid chamber 542 connected to conduit 390 and hence being subject to pressure ($p$) which approximates atmospheric pressure ($p_a$) when fluid reservoir 346 is vented to the atmosphere. A lever 544 is pivoted approximately at its center on a bearing 546 in chamber 542. Lever 544 is movable on bearing 546 in response to a pair of opposed bellows 548 and 550, between the free ends of which the upper end of lever 544 is retained. The left end of bellows 548 is fixed to housing 540 at the left side of chamber 542 and the right end of bellows 550 is fixed to housing 540 at the right side of chamber 542. In the embodiment shown, bellows 550 is filled with a fluid having a predetermined coefficient of thermal expansion and sealed at a desired standard altitude pressure ($p_S$) such as at sea level; if desired, bellows 550 may be evacuated or a single spring-loaded evacuated bellows may be employed in place of bellows 548 and 550 depending upon the kind of mechanism and character of performance desired. Bellows 548 is subject to atmospheric pressure transmitted to its interior thru a vent 552. A spring 554 is compressed between the lower end of lever 544 and a ball valve 556 which engages a seat connected to conduit 400. Lever 544 is in equilibrium when the resultant of forces due to bellows 548 and 550 at its upper end equals the spring force at the lower end. The resultant of the bellows forces is zero when the atmospheric pressure ($p_a$) equals the standard pressure ($p_S$) in bellows 550. When this condition applies, the force of spring 554 is made so that ball valve 556 moves off seat 558 at a predetermined value of the pressure ($p_9$) in conduits 400 and 394. As the atmospheric pressure decreases corresponding to an increase in altitude, the force proportional to the differential ($p_S - p_a$) increases and the upper end of lever 544 moves leftward thereby decreasing the spring load on ball valve 556 and allowing it to open at a decreased value of pressure ($p_9$).

Idle check valve mechanism 320 is similar to mechanism 58 and comprises a body 560 enclosing a ball valve 566, held against its seat by a spring 568. The downstream side of valve 566 is connected to conduit 396 and is therefore subject to the variable control oil pressure ($p_4$). The upstream side of valve 566 is connected to conduit 394 so that the mechanism 320 is effective to permit flow from conduit 394 past valve 566 to conduit 396 when the pressure ($p_9$) exceeds the pressure ($p_4$) by an amount determined by the substantially constant load of spring 568.

The idle control 322 and the idle check valve mechanism 320 cooperate to maintain a minimum value of the variable control oil pressure ($p_4$) and hence a minimum value of fuel flow to the engine. In the embodiment shown, the minimum value of pressure ($p_4$) decreases as altitude increases; if it is desired to increase the idle fuel flow as the altitude increases the respective positions of bellows 548 and 550 may be reversed.

The power amplifier 324 has a generally cylindrical body 570 in which there is a slidable valve sleeve 574. Valve sleeve 574 has a rod 576 fixed to its left end for slidable operation thru the apertured left end of body 570. Rod 576 has a pin-and-slot connection 578 with a lever 580 fixed to a rotatable shaft 582. A valve 586 is slidable inside valve sleeve 574. Valve 586 extends thru the apertured right-hand end of body 570. Valve 586 is operable in response to movement of a shaft 588 on which there is fixed a cam 590 which engages a pin 592 near the end of shaft 586. A chamber 594 is provided between the left-hand end of valve sleeve 574 and the left-hand end of body 570, and a corresponding chamber 596 is provided between the right-hand end of valve sleeve 574 and the right-hand end of body 570. Valve 586 is undercut to form a pair of annular chambers 598 and 600, respectively, between the valve and sleeve 574. Conduit 376 opens into body 570 at a point opposite a recess 604 in the outside of valve sleeve 574, recess 604 being connected to conduit 376 in all normal positions of the valve sleeve. A port 606 is provided radially thru valve sleeve 574 at the center of recess 604. A center section 608 of valve 586 separates chambers 598 and 600 and just closes port 606 when the valve sleeve is in a neutral position as shown. Chamber 600 is connected to chamber 596 by a channel 700 in valve sleeve 574 in all operating positions of both the valve and the valve sleeve. Similarly, chamber 598 is connected to chamber 594 by a channel 702. A pair of ports 704 and 712 is provided in valve sleeve 574 so that when valve section 608 closes port 606, port 704 is just closed by the portion of valve 586 to the right of chamber 600 and port 712 is just closed by the corresponding portion of valve 586 to the left of chamber 598. Port 704 intersects a recess 706 on the outside of sleeve 574 and port 712 intersects a similar recess 716. A pair of ports 714 and 708, respectively, is so located in body 570 that in all normal positions of sleeve 574 there is unrestricted passage for flow between recess 716 and port 714 and between recess 706 and port 708. Conduit 378 is connected to port 714 and to conduit 380 which is connected to port 708.

Power amplifier 324 is provided to minimize the effort required to operate the control lever 264, Figure 1, and hence shaft 266 which is connected to shaft 588 in the power amplifier. When valve sleeve 574 is in a neutral position and lever 264 is moved, shaft 588 turns cam 590 correspondingly and valve 586 is moved to disturb the condition of equilibrium of valve sleeve 574. When valve 586 moves toward the right in respect to sleeve 574, flow of fluid may occur from conduit 376, thru recess 604, port 606, chamber 598, and channel 702 to chamber 594, thereby increasing the pressure in chamber 594. Simultaneously, a path for flow from chamber 596 thru channel 700, chamber 600, port 704, recess 706 and port 708, to conduit 380 is provided so that movement of valve sleeve toward the right is permitted in response to increased pressure in chamber 594 and decreased pressure in chamber 596. When the movement of sleeve 574 equals that of valve 586, a new condition of equilibrium exists at which the valve sleeve and lever 580 remain stationary until valve 586 is again moved. Leftward movement of valve 586 produces similar results in which the pressure in chamber 596 is increased while the pressure in chamber 594 is decreased so that the valve sleeve 574 moves leftward, also. The force required to operate the valve is relatively small while that causing movement of the valve sleeve is sufficiently great to carry whatever load is imposed on lever 580. The force acting on the valve sleeve is a function of the effective area of sleeve 574 and the total drop between the relatively high pressure ($p_1$) in conduit 376 and a pressure ($p_{10}$) in conduit 380.

The pressure ($p_{10}$) in conduit 380 has a value somewhat greater than the value of the pressure ($p$) in conduit 358, depending on design of the chopper valve 382 which comprises an undercut 718 and a notch 722 which valves a port 724. As valve 382 moves upward corresponding to an increase in engine speed, the effective area of flow from port 724 to conduit 358 increases, so that the pressure ($p_{10}$) in conduit 380 decreases. At high speeds, therefore, movement of control lever 264, Figure 1, produces faster response than at low speeds the rate of response of the power amplifier being substantially the same during both acceleration and deceleration of the engine. Similarly, the response at high flight speeds and low flight altitudes is faster than at low flight speeds and high flight altitudes. In all cases, the effort required to move lever 264 is substantially the same.

Operation of the apparatus of Figure 4 is essentially the same as that of Figure 1, except as previously explained and as indicated in the following.

The manual control lever 264 moves thru an arc approximating 100°. It is connected thru shaft 266 to shaft 588, Figure 4, and thru the power amplifier 324 to lever 580 and shaft 582. Shaft 582 is connected to stop cocks 296 and 298 for simultaneous operation of shafts 539 and 522, respectively, so that the fuel stop cock 296 is wide open in the range of lever positions from 20° to 100°, but is manually variable between closed and full open positions in the range from 0° to 20°; and so that the by-pass stop cock 298 is wide open in the range of lever positions from 0° to 80°, but is manually variable between full open and closed positions in the range from 80° to 100°. Thus, the fuel flow is always regulated automatically in the range of lever positions from 20° to 80°, inclusive; may be manually controlled at a value less than the flow producible by automatic regulation in the range of travel from 0° up to normal starting position of the lever, which is approximately at 10°; and may also be manually controlled at a value greater than the flow producible by automatic regulation in the 80°–100° range of travel. If desired, separate control levers may be employed for operation of stop cocks 296 and 298 and they may also be constructed with a common shaft substituted for shafts 522 and 539, as in the apparatus of Figure 5, so that when one stop cock moves in an opening direction the other moves in the opposite or closing direction.

Shaft 582 is also connected to shaft 430 so that clockwise movement of control lever 264 from its zero position to its 80° position increases the lift of cam 428 thereby increasing the setting value of speed, at which governor mechanism becomes effective to reduce the fuel flow, from a minimum to a maximum value. Movement of control lever 264 in its 80°–100° range does not change the speed setting.

Simultaneously with control of the speed governor mechanism 308 by rotation of cam 428 in response to movement of control lever 264, shaft 120 of pressure regulator 60 is actuated so that, as the lever is advanced from 0° to 80° positions and the speed setting is increased from minimum to maximum values, the pressure ($p_2$) in conduit 82 varies from minimum to maximum values. As previously explained, the idle control 322 maintains the variable control oil pressure ($p_4$) above a predetermined minimum value, which varies with altitude, independently of the pressure regulator 60. Idling normally occurs at a point in the initial 20° range of lever movement at which the fuel stop cock 296 is sufficiently open so that it does not affect the control of idle flow by pressure regulator 60 and idle control 322. As the control lever is advanced from 80° to 100° positions, the pressure ($p_2$) as controlled by pressure regulator 60 does not change, as in the apparatus of Figure 1, but by-pass stop cock 298 moves from full open to closed position thereby increasing the fuel flow to a maximum value determined by the capacity of fuel pump 300.

The speed governor droop characteristics are the same in the apparatus of Figure 4 as that of Figure 1, and the governor droop is subject to reduction at altitude in response to the barometric chopper valve 364. The apparatus of Figure 4, however, is distinguished from that of Figure 1 in that the thermal chopper valve 450 is interposed in the path of fluid flow from the governor chopper valve 145 to the barometric chopper valve 364.

The temperature droop is the same in the apparatus of both Figures 1 and 4, since they employ functionally equivalent thermal controls 42, air and fluid respectively being valved in the two embodiments of Figures 1 and 4. In discussion of Figure 1, it was pointed out that the barometric chopper valve performs a threefold function of controlling the character of response to acceleration, altitude and temperature. In the apparatus of Figure 4, the effect of the thermal control on the variable control oil (V. C. O.) pressure is more flexibly controlled with greater independence from other functions of the barometric control, by provision of the thermal chopper valve 450. The combined effects of thermal valve 450 and barometric chopper valve 364 are subsequently explained in connection with Figure 10.

FIGURE 5

Referring to Figure 5, there is shown somewhat diagrammatically fuel and speed control apparatus similar to that of Figure 4. The principal elements which differ substantially from their counterparts in Figure 4 include an electrically actuated thermal override device 726 which takes the place of the hydraulic override 314 of Figure 4, a double stop cock mechanism 728 which replaces the stop cocks 296 and 298 of Figure 4, an additional check valve 730 in a fuel pressure regulator 732 which replaces regulator 294, a somewhat differently constructed barometric control 733 in place of control 318, and a modified pressure line hook-up to the power amplifier 324.

Tube 40 is connected to a conduit 736 for transmission of air at the pressure ($p_E$) from the engine to a chamber 738 in fuel pressure regulator 732, and to the interior of an upper bellows 740 in barometric control 733. Tube 44 transmits the compressor discharge pressure ($p_D$) from the engine to the interior of a lower bellows 742 in the barometric control.

Fuel pump outlet conduit 330 leads thru chamber 326 in double stop cock mechanism 728 and thence thru conduit 46 to the engine manifold 22. Fuel pump 300 is driven by gear 332 operated by the engine and supplies fuel to conduit 46 at pressure ($p_F$) from the inlet conduit 50 which is connected to an indicated source of supply.

Fuel pressure regulator 732 regulates the value of the pressure ($p_F$) in conduit 46, when unrestricted flow is allowed thru double stop cock 728, by by-passing some of the fuel delivered by pump 300 from conduit 330 thru a conduit 744 into chamber 334 and past valve 336 in fuel pressure regulator 732, thence thru conduit 340, chamber 342 in double stop cock 728 and into return conduit 344 connected to inlet conduit 50.

As does the apparatus of Figure 4, the apparatus of Figure 5 employs a closed hydraulic system which includes reservoir 346, from which fluid is supplied to pump 56 thru conduits 354 and 358 at pressure ($p$).

The principal path of flow from fluid pump 56 includes a conduit 746, conduit 72, restriction 76, conduit 78, pressure regulator 60, conduit 82, governor chopper valve 145 in speed governor mechanism 734, conduit 84, thermal override chopper valve 450 in thermal override mechanism 726, conduit 362, barometric chopper valve 364 in barometric control 733, conduits 748, 750 and 752, restricting chopper valve 368, a pair of conduits 762 and 764, and conduit 358. Fluid may also flow in supplementary paths as follows: (1) from conduit 746, thru a conduit 754 and check valve mechanism 58 which is shown diagrammatically in Figure 5, to conduits 96 and 354; (2), from conduit 78, thru pressure regulator 60, to a conduit 756 and conduits 354 and 358; (3), from conduit 376, thru power amplifier 324, conduit 378, a chopper valve 758 in barometric control 733, to conduits 764 and 358; (4), from conduit 376, thru power amplifier 324, a conduit 766, a chopper valve 768 in barometric control 733, and a conduit 770, to conduits 762, 764 and 358; (5), from conduit 72, thru restriction 392, conduit 394, check valve mechanism 320, and conduits 748, 750 and 752 to the fuel pressure regulator 732 and thence thru chopper valve 368, and conduits 762 and 764 to conduit 358; (6), from conduit 394, into a conduit 772, thru idle control 322 and conduit 764 to conduit 358. In all cases, the respective elements are specified in the order of flow.

Check valve mechanism 58 is the same as in the apparatus of Figure 1 and performs the function of regulating the pressure ($p_1$) in conduit 754 and connecting conduits 746 and 72 at a substantially constant value.

Pressure regulator 60 is also the same as in Figures 1, 3 and 4 and serves the same purpose; i. e., it regulates the pressure ($p_2$) in conduit 82, upstream from the speed governor mechanism 734. Shaft 114, which extends downward from regulator 60, is rotated by gear 116 engaged by gear 117 which is mounted on shaft 119. Shaft 119 is rotated by the engine at a speed proportional to the engine speed. The value of the pressure ($p_2$) is variable in response to vertical movement of shaft 120 which extends upwardly from regulator 60. Shaft 120 is toothed to provide engagement with a gear 774 mounted on a fixed shaft 776 and fixed to a lever 778.

Speed governor mechanism 734 has a housing 780 in the lower end of which shaft 140 is mounted for rotation of speed responsive device 138. Shaft 140 is driven by gear 406 which, in turn, is driven by gear 117 at a speed proportional to the engine speed. The governor chopper valve shaft 144 is slidable in response to device 138 in a guide 782 provided in housing 780, tending to move upward as the speed is increased. The upper end of shaft 144 extends above guide 782 and has fixed thereto the ball bearing assembly 152 on which rests spring support 154. Governor spring 156 is in compression between support 154 and another support 784 the position of which is controlled by a cam 786 fixed to a shaft 788 rotatable by means of a lever 790. A link 792 connects the respective upper ends of levers 790 and 778 so that movement of shaft 788 causes movement of both cam 786 and gear 774, and hence angular movement of shaft 788 simultaneously determines the effective setting speed of speed governor mechanism 734 and hence control of the pressure ($p_3$) in conduit 84 as well as the value of the pressure ($p_2$) in conduit 82.

In the apparatus of Figure 5, thermal override device 726 is actuated by an electrically operated actuator 794 which responds to an electrical thermal control pickup diagrammatically shown as 796 located in the tail pipe of the engine. Allowing for temperature "droop" which has somewhat the same characteristics in the apparatus of Figure 5 as in those of Figures 1 and 4, when the engine temperature exceeds a predetermined value, thermal control pickup 796 causes actuator 794 to rotate a shaft 798 in a sense to move shaft 798 in an upward direction. For example, pickup 796 may operate a reversing switch to control the direction of motion of a motor in actuator 794. Thermal override mechanism 726 has a generally cylindrical body 800 having therein a pair of coaxial bores 802 and 804. The lower bore 804 is threaded to correspond to the upper end of shaft 798. A valve shaft 806 slidably operable in bore 802 is connected to the upper end of shaft 798 by a stem 808 having fixed thereto a disc 810 fitted into shaft 798 so that stem 808 and shaft 798 may rotate independently of each other but so that vertical movement of shaft 798 is transmitted to stem 808 and hence to shaft 806. Shaft 806 extends above body 800 and is connected to shaft 119 or other suitable means of rotation. The thermal override chopper valve 450 includes undercut 451, annular chamber 456 and notch 452, and controls the flow of fluid from port 454 at the right end of conduit 84 to port 458 at the left end of conduit 362. The effective area of flow thru chopper valve 450 decreases as actuator 794 moves shaft 806 upwardly, as is the case when a predetermined engine temperature is exceeded. The pressure ($p_5$) in conduit 362 normally has a value approximately equal to that of the pressure ($p_3$) in conduit 84, until the predetermined engine temperature is exceeded and valve 450 moves upward, when pressure ($p_5$) is decreased. When the engine temperature decreases and is restored to a value equal to or slightly less than the predetermined value, actuator 794 restores chopper valve 450 to a substantially full open position.

The barometric control 733 has an approximately central column 812 to the upper and lower ends of which are respectively symmetrically fixed a pair of cylindrical casings 814 and 816. The upper end of bellows 740 is fixed inside casing 814 to its upper end, the lower end of bellows 740 being supported by a plate 818 which is connected thru a bearing assembly 820 with the upper end of a valve shaft 822, which operates in a guide 824 in column 812. Similarly, the lower end of bellows 742 is fixed inside casing 816 to its lower end, the upper end of bellows 742 being connected to another plate 826 which supports a bearing assembly 828 thru which plate 826 is connected to shaft 822. A gear 829 mounted on shaft 822 is connected to gear 117 for rotation of the shaft. Valve shaft 822 is therefore both slidable and rotatable in guide 824, it being provided that the vertical movement of bellows 740 and 742 is transmitted thru bearings 820 and 828, respectively, without lost motion.

Chambers 832 and 834, respectively, outside bellows 740 and 742 are vented to atmosphere at vents 836 and 838, but may be vented to any other available common pressure, if desired. A spring 840 is compressed between the top of casing 814 and plate 818, and tends to move valve shaft 822 downward in opposition to an upward force due to the pressure differential ($p_D - p_E$) acting on bellows 742 and 740. Movement of shaft 822, and hence the movement of chopper valves 758, 760, 364, and 368 is in accordance with a predetermined function of the pressure differential ($p_D - p_E$). As in the apparatus of Figure 4, when the differential increases corresponding to an increase of engine or flight speed or to an altitude decrease, shaft 822 moves upward.

The effective area of flow thru the barometric chopper valve 364 increases as shaft 822 rises or as the differential ($p_D - p_E$) increases. The path of flow from the valve thru conduits 748, 750, and 752 at the variable control oil pressure ($p_4$) to the restricting chopper valve 368 and thence to conduits 762, 764 and 358 exactly corresponds to flow from the equivalent valves 364 and 368 in the apparatus of Figure 4 and identical results are produced. Similarly, the connection between the barometric chopper valve 364 thru conduit 748 to check valve mechanism 320 and thence thru conduit 394 to idle control 322, restriction 392 and conduit 72 both structurally and functionally correspond to the equivalent connection in the apparatus of Figure 4. Both the idle control 322 and check valve mechanism 320 function as in Figure 4.

The fuel pressure control 732 differs slightly from the control 294 of Figure 4 owing to its having the additional ball check valve 730 and an additional fixed restriction 842. Fuel pressure regulator 732 includes a casing 844, the upper end of which has a greater diameter than that of the lower end in which piston valve 336 is slidably operable to control the effective area of flow thru port 732 connected to conduit 340. Piston 336 is connected by rod 502 to the upper ends of a pair of telescoped bellows 496 and 498 which are fastened inside and to the lower end of the enlarged upper portion of casing 844. Chamber 334 below piston 336 is connected to conduit 744 and is separated by the piston from chamber 508 inside bellows 498. Chamber 492, outside bellows 496, has two parallel connections with conduit 752: the first thru fixed restriction 842 connected to conduit 752; and the second thru a conduit 846 in the upper end of which is normally seated a ball valve 730, and a chamber 848 connected to conduit 752. A spring 850 is compressed between valve 730 and the right-hand end of chamber 848 and tends to seat valve 730, thereby tending to prevent flow from conduit 846 to conduit 752.

In operation, when the variable control oil pressure ($p_4$) in conduit 752 rapidly increases, the fuel pressure regulator 732 becomes subject to the increased pressure ($p_4$) only as flow occurs thru the restriction 842. Abrupt response to rapid increase of pressure ($p_4$) is prohibited therefore and the fuel pressure regulator supplements the barometric chopper valve 364 as an acceleration control. Conversely, when the value of the variable control oil pressure ($p_4$) rapidly decreases, check valve 730 opens so that deceleration occurs more rapidly than acceleration and is affected by the fuel pressure control 732 only as is determined by the load on spring 850.

In the embodiment of Figure 5, simultaneous operation of the power amplifier 324 and the barometric control 733 affords dual means for controlling acceleration and tends to render less important the acceleration control aspects of the barometric control. The latter may therefore be designed with relatively greater emphasis on altitude or corresponding compensation, if desired. The greater flexibility of acceleration control thus afforded by use of both the power amplifier and the barometric control is employable to advantage, however, in anticipating "compressor stall." The latter phenomenon manifests itself during acceleration of some engines and results when fuel is supplied to an engine at a faster rate than can produce desired acceleration. A dangerous temperature rise characterizes "compressor stall" so that the control of acceleration is rendered of utmost importance. The embodiment of Figure 4 is similar to that of Figure 5 in respect to combination of the power amplifier with the barometric control as dual means of acceleration control. In Figure 5, the fuel pressure regulator 732 serves still further as a means of controlling acceleration.

The double stop cock 728 is a combination of the fuel and by-pass stop cocks 296 and 298 of the apparatus of Figure 4. It comprises a body 852 in which there are two parallel cylindrical guides 854 and 856. The fuel shut-off piston valve 516 is connected by toothed shaft 518 to piston 514 in guide 854. The by-pass shut-off piston 534 is connected by toothed shaft 536 to piston 532 in guide 856. A single gear 858 mounted on a shaft 860 engages both toothed shafts 518 and 536, so that as shaft 860 is turned counter-clockwise from the mid-position shown in the drawing, piston 516 is moved toward full cut-off position while piston 534 simultaneously moves to a full open position in which piston 534 overtravels the entrance to conduit 344 without producing any change of flow. Conversely, when shaft 860 is moved clockwise, pistons 534 and 516 move simultaneously to cut-off and wide-open positions, respectively. Shaft 860 is connected to shaft 582 for operation thereby.

With a single exception, power mechanism 324 is the same as that shown in Figure 4. In the apparatus of Figure 4, discharge from recesses 716 and 706 flows into a single conduit 380 and thence thru a chopper valve 382 in the barometric control and the rate of response of the power amplifier is the same during acceleration as during deceleration of the engine. In the apparatus of Figure 5, however, fluid discharged from recesses 716 and 706 is conveyed by the separate conduits 378 and 766, respectively, to parallel chopper valves 758 and 768 in barometric control 733. As the compressor pressure differential increases, the pressure in both conduits 378 and 766 decreases in the embodiment shown but the two valves 758 and 768 may be of different contour so as to render the rate of response of amplifier 324 during acceleration independent from the corresponding rate of response during deceleration. Shaft 588 of the power amplifier is operated by the control lever 264, Figure 1, and thereby varies the position of cam 590 which determines the respective positions of shaft 576, lever 580, and shaft 582.

Operation of the engine control lever produces the same effects in the apparatus of Figure 5 as was described in reference to the apparatus of Figure 4.

FIGURE 6

In Figure 6, there is shown a typical relationship between the position of the engine control lever 264, Figure 1, in degrees, and the engine speed, for comparative conditions at which the speed governor mechanism begins to cut in and at which full governor cut-in occurs. As previously explained, the force produced on the valve by the flyball speed responsive device 138 is proportional to the square of the speed. As shown in Figure 6, cut-in begins at 2,000 R. P. M. when the lever position is 0° and at 10,000 R. P. M. when the lever position is 90°. The beginning of cut-in is shown to be a straight-line function of lever movement, the slope of the line being determined by the respective values of lever position and speed at any two values of the lever position. The amount of governor valve travel between respective positions at which cut-in begins and at which full cut-in occurs is constant, and the change of force of device 138 from beginning of cut-in to full cut-in is substantially constant when a constant rate governor spring is employed. Since the force varies as the square of the speed, the change of speed required to produce the necessary change of force is greater at low speed than at high speed. As shown in Figure 6, a change of speed from 2,000 to 4,000 R. P. M. is required at 0° lever position, while a corresponding change from 10,000 to 10,250 R. P. M. is required at 90° lever position. The respective values of governor droop at 0° and 90° lever positions are 100% and only 5% in the particular apparatus to which Figure 6 applies.

FIGURE 7

Figure 7 graphically shows the relationship between the variable control oil (V. C. O.) pressure, p. s. i. absolute, and the engine speed, for comparative conditions in which the speed governor is set for full speed and idling speed, respectively. As previously indicated in Figure 6, the governor droop when the governor is set at idling speed is approximately 2,000 R. P. M., or 100% while the governor droop when the governor is set at full speed is approximately 500 R. P. M. or only 5% in the case shown. Steady state operation normally occurs at the respective values of speed indicated as (A) and (B). At full cut-in, the respective values of the variable control oil pressure for the two conditions shown are relatively closer than at the beginning of cut-in, owing to function of the barometric chopper valve which renders the governor valve more effective at high speeds and hence at high values of the compressor discharge pressure than at low speeds and correspondingly low values of the compressor discharge pressure.

FIGURE 8

Figure 8 graphically shows the relationship between the variable control oil (V. C. O.) pressure, p. s. i. absolute, and the engine speed, for comparative conditions in which the compressor discharge pressure is respectively 10, 30, 50, and 70 p. s. i. absolute. Each horizontal line leftward of the governor cut-in ordinate (A) represents a condition in which the compressor discharge pressure is constant even though the engine speed increases. It follows that for the compressor discharge pressure to remain constant, the altitude must increase and/or the flight speed must decrease as the engine speed increases. For illustrative purposes we may say that each of the leftward horizontal lines represents a condition of increasing altitude and engine speed. Since governor cut-in begins at a single value of engine speed regardless of the value of compressor discharge pressure, then the altitude increases at any constant value of speed as the compressor discharge pressure decreases, whence the top line (70) represents lowest altitude and the bottom line (10) represents highest altitude. Full cut-in similarly occurs at a single value of speed corresponding to ordinate (B) and the respective values of the variable control oil (V. C. O.) pressure at full cut-in are more nearly the same than at the beginning of cut-in, owing to the relatively greater opening of the barometric chopper valve at high values of the compressor discharge pressure and owing to the increasing effect of the governor chopper valve as the barometric chopper valve opening increases.

In each of the embodiments shown, the governor chopper valve is upstream from the barometric chopper valve. Fluid is supplied to the governor chopper valve at the substantially constant ($p_2$) the value of which is manually controlled. A fixed restricting chopper valve is provided downstream from the barometric chopper valve and the pressure ($p_4$) therebetween is the variable control oil pressure used to control the fuel flow. It is apparent in this arrangement that, as the barometric chopper valve closes when altitude of flight increases or an equivalent change occurs, the effect of the governor chopper valve upon the value of pressure ($p_4$) decreases. Hence, at high altitudes or whenever the barometric chopper valve is in an extreme restricting position, sensitivity of the governor chopper valve is minimum thereby affording a desired condition of relatively greater stability of speed governor performance at high than at low flight altitudes. The slope of the lines of Figure 8, between the beginning of cut-in and full cut-in decreases as the compressor discharge pressure decreases or as the altitude increases, thus graphically illustrating the decrease in sensitivity of the governor chopper valve as the altitude increases.

In control apparatus in which the relative positions of the governor and barometric chopper valves are reversed, so that the pressure downstream from the governor chopper valve is the variable control oil pressure ($p_4$), then as the barometric chopper valve closes corresponding to an altitude increase, the governor chopper valve becomes increasingly sensitive; i. e., the change in the value of pressure ($p_4$) corresponding to movement of the governor chopper valve from beginning of cut-in to full cut-in positions is greater than when the barometric chopper valve is relatively wide open. This condition is avoided in the apparatus of Figures 1, 3, 4 and 5, thereby affording a desired condition of relatively greater stability of speed governor performance at high than at low flight altitude.

FIGURE 9

Figure 9 shows the relationship between engine temperature and engine speed for an assumed condition of altitude and flight speed. The maximum safe operating temperature shown at (B) decreases slightly as the speed increases. The thermal control 42 has a fixed temperature setting shown at (C) at which it becomes effective regardless of engine speed or other operating conditions. In steady state operation indicated at (D), the temperature increases as the speed increases and at maximum engine speed, the temperature is a predetermined minimum amount less than the thermal control temperature setting. This is accomplished as a function of the speed governor mechanism which cuts in at maximum speed or any lower valued setting speed to reduce the fuel flow and hence to maintain the temperature below the predetermined limiting value. In acceleration, however, as shown at (E), the fuel flow at any value of speed is always greater than that applying at that value of speed in steady state operation. The engine temperature is therefore higher until maximum speed is attained, when the acceleration and steady state temperature curves become coincident. During rapid acceleration, a condition may exist in which the engine temperature may vary temporarily rise to a value at which the thermal control becomes effective. This necessarily involves a close approach to the maximum safe temperature since the thermal control does not immediately respond to the existing engine temperature. A typical peak of short duration such as described is indicated at (A).

FIGURE 10

Figure 10 graphically illustrates the relationship between the variable control oil (V. C. O.) pressure ($p_4$) and the engine temperature, for comparative conditions of relative high and low values of the compressor discharge pressure and of pressure ($p_4$) when the thermal control becomes effective and thermal cut-in occurs. As shown in Figure 10, the temperature droop is constant and is represented by an increase of temperature ($a$) to ($b$) corresponding to the respective temperatures at the beginning of thermal cut-in and full thermal cut-in. The barometric chopper valve cannot alter the temperature droop, but it does control the response to thermal cut-in much as it controls response to speed governor cut-in, as shown in Figure 8.

The terms and expressions herein are employed for purposes of description and not of limitation, and I have no intention, in the use of such terms and expressions, of excluding any equivalents of the features shown and described or portions thereof, but recognize that various modifications are possible within the scope of the invention claimed.

I claim as my invention:

1. Fuel and speed control apparatus for an internal combustion engine having associated therewith a compressor and a fuel pump for delivery of air and fuel respectively thereto, comprising: a source of hydraulic fluid at substantially constant superatmospheric pressure, a conduit for the flow of fluid from said source, valve means in said conduit for controlling the flow therethru and hence for controlling the pressure downstream from said valve means; said valve means including a pair of ports in series in said conduit, a rotatable valve separating said ports and slidable therepast at right angles to the direction of said rotation, a circumferentially discontinuous relieved portion of said valve having varying cross-sectional area for the flow of fluid between said ports past said valve, said valve being effective in response to continuous rotation thereof to regularly intermit said flow and being also effective in response to said sliding motion to vary the effective area of said flow, thereby varying said downstream pressure as a function of said sliding movement; driving means for continuously rotating said valve, operating means for producing said sliding motion, and control means responsive to said downstream pressure for varying the delivery of said pump, whereby the fuel flow to said engine varies as a function of said operating means.

2. Control apparatus set forth in claim 1, including manually operated means for varying the value of said substantially constant super-atmospheric pressure, said operating means being adapted to respond to an air pressure in said engine, whereby said fuel flow varies as a function of said manually operated means and said pressure.

3. Control apparatus as set forth in claim 1, including engine speed responsive means in said conduit for modifying said downstream pressure, said operating means being adapted to respond to an air pressure in said engine, whereby said fuel flow varies as a function of said speed and said air pressure.

4. Control apparatus as set forth in claim 1, including manually operated means for varying the value of said substantially constant super-atmospheric pressure, said operating means being responsive to an air pressure in said engine, and means responsive to the speed and temperature of said engine for modifying said downstream pressure, whereby said fuel flow varies as a function of said manually operated means, said air pressure, said speed, and said temperature.

5. Control apparatus for a pump having delivery varying means, comprising: a source of hydraulic fluid at substantially constant pressure, manually operated means for determining the value of said substantially constant pressure, a conduit for the flow of fluid from said source, valve means in said conduit for controlling the flow therethru and hence for controlling the pressure downstream from said valve means; said valve means including a pair of ports in series in said conduit, a rotatable valve separating said ports and slidable therepast at right angles to the direction of said rotation, a circumferentially discontinuous relieved portion of said valve having varying cross-sectional area for the flow of fluid between said ports past said valve, said valve being effective in response to continuous rotation thereof to regularly intermit said flow and being also effective in response to said sliding motion to vary the effective area of said flow, thereby varying said downstream pressure as a function of said sliding movement; driving means for continuously rotating said valve, and operating means for producing said sliding motion, said delivery varying means being responsive to said downstream pressure, whereby said pump delivery varies as a function of said operating means and said manually operated means.

6. Fuel and speed control apparatus for an internal combustion engine having associated therewith a compressor and a fuel pump for delivery of air and fuel respectively thereto, comprising: a source of hydraulic fluid at substantially constant superatmospheric pressure and a reservoir of said fluid at relatively low pressure of pre-established value, a conduit for the flow of fluid from said source to said reservoir, first and second valve means in series in said conduit for controlling the flow therethru and hence the respective pressures downstream from each of said valve means; each of said first and second valve means including a pair of ports in series in said conduit, a rotatable valve separating said ports and slidable therepast at right angles to the direction of said rotation, a circumferentially discontinuous relieved portion of said valve having varying cross-sectional area for the flow of fluid between said ports past said valve, said valve being effective in response to continuous rotation thereof to regularly intermit said flow and being also effective in response to said sliding motion to vary the effective area of said flow, thereby varying the respective pressures downstream from the first and second valves corresponding to said first and second valve means as functions of said respective sliding movements of said first and second valves; first and second driving means respectively for continuously rotating the first and second valves corresponding to said first and second valve means, a first device responsive to the engine speed for slidably operating said first valve, a second device responsive to an air pressure in said engine for slidably operating said second valve, and control means responsive to the pressure of fluid downstream from said two valve means for varying the delivery of said pump, whereby the fuel flow to said engine varies as a function of said speed and said condition.

7. Control apparatus as set forth in claim 6, including manually operated means for varying the value of said substantially constant superatmospheric pressure, and a connection between said first and second driving means for rotation thereof by said engine, whereby said fuel flow varies as a function of said speed, said air pressure, and said manually operated means.

8. Control apparatus as set forth in claim 6, including restricting means in said conduit for controlling the flow therethru to produce a differential across said restricting means between said pressure downstream from said first and second valve means and said pre-established pressure in said reservoir, and thermal control means for modifying said pressure downstream from said first and second valve means when a preselected value of engine temperature is exceeded, whereby said fuel flow varies as a function of said speed, said pressure, and said temperature.

9. Control apparatus as set forth in claim 6, including first manually operated means for controlling the value of said substantially constant pressure, said first valve being upstream from said second valve and said first device being effective to operate said first valve to reduce the pressure downstream from said first valve when a predetermined value of speed is exceeded, second manually operated means for varying said predetermined value of speed, said second device being responsive to the compressor discharge pressure in said engine and effective to increase said flow thru said second valve means and hence to increase the pressure downstream from said second valve means when said compressor discharge pressure increases, a restriction in said conduit downstream from said second valve means, said restriction being effective to control the flow therethru to maintain a differential thereacross between the pressure downstream from said second valve means and said pre-established pressure in said reservoir, whereby the fuel flow to the engine varies as a function of said first and said second manually operated means and said compressor discharge pressure.

10. Control apparatus for a pump having delivery varying means associated therewith, comprising: a source of hydraulic fluid at substantially constant pressure, a conduit for the flow of fluid from said source, first and second valve means in series in said conduit for controlling the flow therethru and hence the respective pressures downstream from each of said valve means, each of said first and second valve means including a pair of ports in series in said conduit, a rotatable valve separating said ports and slidable therepast at right angles to the direction of said rotation, a circumferentially discontinuous relieved portion of said valve having varying cross-sectional area for the flow of fluid between said ports past said valve, said valve being effective in response to continuous rotation thereof to regularly intermit said flow and being also effective in response to said sliding motion to vary the effective area of said flow, thereby varying the respective pressures downstream from the first and second valves corresponding to said first and second valve means as functions of said respective sliding movements of said first and second valves, driving means for simultaneous and continuous rotation of the first and second valves corresponding to said first and second valve means, and first and second operating means respectively for slidably operating said first and second valves, said delivery varying means being responsive to the pressure downstream from said first and second valve means, whereby said pump delivery varies as a function of said first and second operating means.

11. Fuel and speed control apparatus for an internal combustion engine having associated therewith a compressor and a fuel pump for delivery of air and fuel respectively thereto, and a manually operated engine control lever, comprising: a reservoir of hydraulic fluid and a conduit for the flow of fluid therefrom, a fluid pump in said conduit for producing said flow, regulating means for maintaining the fluid pressure in said conduit downstream from said regulating means at a substantially constant value, first and second valve means in said conduit downstream from said regulating means for varying the flow to control the fluid pressure in a portion thereof, each of said first and second valve means including a pair of ports in series in said conduit, a rotatable valve separating said ports and slidable therepast at right angles to the direction of said rotation, a circumferentially discontinuous relieved portion of said valve having varying cross-sectional area for the flow of fluid between said ports past said valve, said valve being effective in response to continuous rotation thereof to regularly intermit said flow and being also effective in response to said sliding motion to vary the effective area of said flow, so that said fluid pressure in said portion of said conduit varies as a function of the movements of the respective first and second valves corresponding to said first and second valve means, driving means for continuously rotating the first and second valves corresponding to said first and second valve means, a first device responsive to the engine speed for slidably operating said first valve to decrease said fluid pressure in said portion of said conduit when a predetermined value of speed is exceeded, a first connection between said first valve means and said lever for varying said predetermined value, a second device responsive to an air pressure in said engine for slidably operating said second valve, and control means responsive to said fluid pressure in said portion of said conduit for varying the delivery of said fuel pump, whereby the fuel flow to said engine varies as a function of said control lever position and said engine air pressure.

12. Control apparatus as set forth in claim 11 wherein there is additionally comprised means for regulating the fluid pressure upstream from said regulating means, a second connection between said regulating means and said lever for determining the value of said substantially constant fluid pressure, a third rotating valve separating a fifth and a sixth port in series in said conduit downstream from said first and second valve means, said third valve having at least one undercut thereon and being effective to permit intermittent flow between said fifth and sixth ports thru said undercut and being thereby also effective to reduce said conduit flow as a function of the cross-sectional areas of said undercut and said fifth and sixth ports, whereby the fuel flow to said engine varies as a function of said control lever and said engine air pressure.

13. Control apparatus as set forth in claim 11, including said regulating means including a regulating valve for by-passing fluid to the said reservoir, means connected to said driving means for rotating said regulating valve to prevent sticking, and a spring biasing said regulating valve toward its closed position for determining said substantially constant value, a second connection between said spring and said first connection for varying said value of said substantially constant fluid pressure, a third rotating valve separating a fifth and a sixth port in series in said conduit downstream from said first and second valve means, said third valve having at least one undercut thereon and being effective to permit intermittent flow between said fifth and sixth ports thru said undercut and being thereby also effective to reduce said conduit flow as a function of the cross-sectional areas of said undercut and said fifth and sixth ports, said second and third valves being provided in a common shaft operated by said driving means and said second device, said second device including a bellows subject to an air pressure in said engine for slidable operation of said second valve so as to increase the value of said fluid pressure in said portion of said conduit as said engine air pressure increases and to determine the rate of engine speed increase when said lever is operated in a speed-increasing sense, whereby the fuel flow to the engine varies as a function of said control lever and said engine air pressure.

14. Control apparatus as set forth in claim 11, including a second connection between said regulating means and said first connection for determining the value of said substantially constant fluid pressure as a function of said lever position, a restriction downstream from said first and second valve means for limiting said conduit flow, said restriction being subject to the differential between said fluid pressure in said portion of said conduit and the fluid pressure in said reservoir, and a thermal control responsive to the engine temperature and effective to reduce the value of said fluid pressure in said portion of said conduit when a predetermined value of temperature is exceeded, said fuel pump control means being effective to increase said fuel delivery as said fluid pressure in said portion of said conduit increases, whereby the fuel flow to said engine varies as a function of said control lever position, said engine air pressure, and said temperature.

15. Control apparatus as set forth in claim 11, including a second connection between said regulating means and said first connection for rendering said regulating means and said first connection simultaneously responsive to said lever, said second device being responsive to the compressor discharge pressure in said engine, said fuel pump control means being effective to increase said fuel pump delivery as said fluid pressure increases in said portion of said conduit, a thermal control responsive to the engine temperature for decreasing said fluid pressure in said portion of said conduit when a predetermined value of temperature is exceeded, said control lever being effective when and as advanced thru a preselected range of movement thereof to simultaneously increase the respective values of said substantially constant fluid pressure and said predetermined speed and hence to increase said fuel flow to said engine.

16. Control apparatus for a pump having delivery varying means associated therewith, comprising: a reservoir of hydraulic fluid and a conduit for the flow of fluid therefrom, means in said conduit for producing said flow, regulating means for maintaining the pressure downstream from said regulating means at a substantially constant value, first and second valve means in said conduit downstream from said regulating means for varying the flow to control the pressure in a portion thereof, each of said first and second valve means including a pair of ports in series in said conduit, a rotatable valve separating said ports and slidable therepast at right angles to the direction of said rotation, a circumferentially discontinuous relieved portion of said valve having varying cross-sectional area for the flow of fluid between said ports past said valve, said valve being effective in response to continuous rotation thereof to regularly intermit said flow and being also effective in response to said sliding motion to vary the effective area of said flow, so that said pressure in said portion of said conduit varies as a function of the movements of the respective first and second valves corresponding to said first and second valve means, driving means for continuously rotating the first and second valves corresponding to said first and second valve means, operating means for slidably operating said first and second valves, and a third rotating valve separating a fifth and sixth port in series in said conduit downstream from said first and second valve means, said third valve having at least one undercut thereon and being effective to permit intermittent flow between said fifth and sixth ports thru said undercut and being thereby also effective to reduce said conduit flow as a function of the cross-sectional areas of said undercut and said fifth and sixth ports, said second and third valves being provided in a common shaft operated by said driving means and said second device, whereby said pump delivery varies as a function of said operating means.

17. Fuel and speed control apparatus for an internal combustion engine having associated therewith a compressor and a fuel pump for delivery of air and fuel respectively thereto, comprising: a source of hydraulic fluid at substantially constant superatmospheric pressure, a reservoir of said fluid at relatively low pressure of pre-established value, and a conduit for the flow of fluid from said source to said reservoir, first valve means in said conduit and second valve means downstream from said first valve means, said first and said second valve means being respectively responsive to the engine speed and to an air pressure in said engine and being effective to control the fluid pressure in a portion of said conduit, and control means responsive to the controlled fluid pressure in said conduit portion for varying the delivery of said fuel pump, whereby the fuel flow to said engine varies as a function of said speed and said engine air pressure.

18. Control apparatus as set forth in claim 17, including manually operated means for determining the value of said substantially constant superatmospheric fluid pressure, said first valve means being effective to reduce said downstream fluid pressure when a predetermined value of speed is exceeded, said second valve means being responsive to an air pressure in said engine and also effective to reduce said downstream fluid pressure as the value of said air pressure decreases, said fuel pump control means being effective to vary said fuel flow directly with the value of the fluid pressure in said conduit portion.

19. Control apparatus as set forth in claim 17, including said first valve means being effective to reduce said downstream fluid pressure when a predetermined value of speed is exceeded, manually operated means for varying said predetermined value of speed, said second valve means being responsive to the compressor discharge pressure in said engine and effective to increase said controlled fluid pressure as said compressor discharge pressure increases corresponding to an engine speed increase in response to said manually operated means, said second valve means also being effective to control the rate of change of said controlled fluid pressure so as to control the acceleration of said engine, and a thermal control responsive to the engine temperature for decreasing the value of said controlled fluid pressure when a preselected value of temperature is exceeded, whereby said fuel flow varies as a function of said manually operated means, said compressor discharge pressure, and said temperature.

20. Control apparatus as set forth in claim 17, including first manually operated means for determining the value of said substantially constant superatmospheric fluid pressure, said first valve means being effective to reduce said controlled fluid pressure when a predetermined value of speed is exceeded, second manually operated means for varying said predetermined value of speed, said second valve means including at least one bellows responsive to a pressure differential one component of which is the compressor discharge pressure in said engine, said second valve means being operable by said bellows to decrease said controlled fluid pressure as said compressor discharge pressure decreases, a valve in said second valve means having a contour for preselecting the rate of change of controlled fluid pressure corresponding to said compressor discharge pressure decrease, and a restriction in said conduit downstream from said second valve means for limiting said conduit flow, said fuel pump control apparatus being effective to vary said fuel flow directly with the value of said downstream fluid pressure, whereby said fuel flow increases as said first manually operated means increases the value of said substantially constant fluid pressure and as said compressor discharge pressure increases, and whereby said engine speed does not exceed said predetermined value.

21. Control apparatus as set forth in claim 17, including a first valve in said first valve means having a first position wherein said first valve is ineffective and a second position wherein said first valve reduces the effective area of flow thru said first valve to a pre-established minimum value, operating means in said first valve means for moving said first valve from said first to said second position as said engine speed increases from a first value to a second value, first means for varying said first value, second means for controlling the differential between said first and second values, said condition being a function of said engine speed, said second valve means being effective to vary the flow therethru in accordance with said function of said speed, whereby the rate of change of said controlled fluid pressure and hence the rate of change of said fuel flow as said engine speed varies between said first and second values is a function of said manually operated means and said engine speed.

22. Fuel and speed control apparatus for an internal combustion engine having associated therewith a compressor and a fuel pump for delivery of air and fuel respectively thereto, and a manually operated engine control lever, comprising: a fluid reservoir and a fluid pump connected thereto for the flow of fluid therefrom, a conduit for said fluid flow from said fluid pump, regulating means in said conduit for controlling the flow thru said regulating means to regulate the fluid pressure downstream therefrom at a substantially constant value, first manually operated means for determining said substantially constant value, a device responsive to the engine speed, a first valve in said conduit downstream from said regulating means responsive to said device and effective to modify the fluid pressure downstream from said first valve when a predetermined value of speed is exceeded, second manually operated means connected to said lever for varying said predetermined value of speed, a connection between said second and said first manually operated means, a bellows responsive to an air pressure in said engine, a valve shaft operated by said bellows, a second valve on said shaft, said second valve being in said conduit downstream from said first valve and being effective to increase the flow therethru as said air pressure increases thereby increasing the fluid pressure downstream from said second valve, a restriction in said conduit downstream from said second valve for controlling the flow therethru as a function of the differential thereacross between said controlled fluid pressure and the fluid pressure in said reservoir, a thermal control responsive to the engine temperature for modifying said fluid pressure in said portion of said conduit, and a fuel pump control means responsive to said fluid pressure in said portion of said conduit and effective to vary the delivery of said fuel pump, whereby the fuel flow to said engine varies as a function of said control lever position, said speed, said air pressure, and said temperature.

23. Fuel and speed control apparatus for an internal combustion engine having associated therewith a compressor and a fuel pump for delivery of air and fuel respectively thereto, said pump having delivery varying means connected thereto, comprising: a source of hydraulic fluid at substantially constant superatmospheric pressure, a conduit for the flow of fluid from said source, a device responsive to the engine speed, governor valve means in said conduit responsive to said device and effective to vary the flow thru said conduit to control the pressure in a portion of said conduit downstream from said governor valve means, and motor means having a piston included therein for controlling said delivery varying means as a function of movement of said piston, said piston being responsive to the differential between said pressure in said portion of said conduit and the pressure at the outlet of said fuel pump, whereby the fuel flow to the engine varies as a function of said speed.

24. Control apparatus as set forth in claim 23, including manually operated means for determining the value of said superatmospheric pressure, and a spring biasing said piston in opposition to said fuel pump outlet pressure for maintaining said differential at a substantially constant value, whereby said fuel flow also varies as a function of said manually operated means.

25. Control apparatus as set forth in claim 23, including a fuel conduit for the flow of fuel from said pump to said engine, a restriction in said fuel conduit whereby the fuel flow to the engine is a function of the fuel pressure upstream from said restriction, first manually operated means for determining the value of said superatmospheric pressure, barometric valve means responsive to an air pressure in said engine and effective to modify said fluid pressure in said portion of said conduit, said governor valve means being effective to reduce said fluid pressure in said portion of said conduit when a predetermined value of speed is exceeded, and second manually operated means for varying said predetermined value of speed.

26. Control apparatus as set forth in claim 23, including barometric valve means in said conduit downstream from said governor valve means responsive to an air pressure derived from an air pressure in said engine and effective to increase said fluid pressure in said portion of said conduit as said derived air pressure increases, and thermal control means responsive to the engine temperature for controlling the value of said derived air pressure, said piston being effective to operate said delivery varying means in a delivery-increasing sense when the value of said fluid pressure in said portion of said conduit increases and to operate said delivery varying means in a delivery-decreasing sense when the value of said fluid pressure in said portion of said conduit decreases, whereby said fluel flow to said engine varies as a function of said speed, said engine air pressure, and said temperature.

27. Fuel and speed control apparatus for an internal combustion engine having associated therewith a compressor and a fuel pump for delivery of air and fuel respectively thereto, said pump having delivery varying means connected thereto, and a manually operated engine control lever, comprising: a reservoir of hydraulic fluid and a conduit for the flow of fluid therefrom, a fluid pump in said conduit for producing said flow, a regulating valve for regulating the fluid pressure in a first portion of said conduit at a substantially constant value, first manually operated means connected to said lever for determining said substantially constant value, a device responsive to the engine speed, a governor spring for varying the response of said device to said speed, a governor valve in said conduit downstream from said first portion of said conduit, said governor valve being operated by said device and effective to control the pressure of fluid in a second portion of said conduit so as to reduce the value thereof when a value of speed pre-established by the deflection of said spring is exceeded, second manually operated means connected to said lever for varying said deflection of said governor spring and hence for varying said pre-established value of said speed, a first adjustable stop for limiting the movement of said governor valve in a closing direction, a second adjustable stop for limiting the movement of said control lever in a spring deflection-decreasing direction, a third adjustable stop for limiting the movement of said control lever in a spring deflection-increasing direction, thermal control means including a channel for the flow of air from the downstream to the upstream side of said compressor, a restriction in said channel, a thermal valve downstream from said restriction, and thermal means responsive to the engine temperature for opening said thermal valve to permit flow in said channel when a predetermined value of temperature is exceeded, a barometric control valve responsive to the absolute air pressure upstream from said thermal valve for decreasing said fluid pressure in said second portion of said conduit at a predetermined rate when the value of said absolute air pressure decreases, motor means having a piston included therein for controlling said delivery varying means as a function of movement of said piston, said piston being responsive to the differential between said fluid pressure in said second portion of said conduit and the fluid pressure at the outlet of said fuel pump and being effective to operate said delivery varying means to respectively increase or decrease said delivery when the value of said fluid pressure in said second portion of said conduit increases or decreases, and means for rotating said regulating valve, said governor valve and said barometric control valve to prevent sticking, whereby the fuel flow to the engine varies as a function of said control lever, said speed, said absolute air pressure, and said temperature.

28. Control apparatus for a pump, comprising: a source of hydraulic fluid at substantially constant pressure, a conduit for the flow of fluid from said source, manually operated valve means in said conduit downstream from said source for controlling the pressure in a portion of said conduit connected to a motor means which is responsive to the differential between said pressure in said conduit portion and the pressure at the outlet from said pump, said motor means including means to maintain said differential at a substantially constant predetermined value, whereby said pump outlet pressure varies as a function of the operation of said manually operated valve means.

29. Control apparatus for a fuel pump, comprising: a source of hydraulic fluid and a conduit for the flow of fluid therefrom, means in said conduit for producing said flow, first and second valve means in series in said conduit downstream from said flow producing means for controlling the pressure in a portion of said conduit connected to a motor means which is responsive to the differential between said pressure in said conduit portion and the pressure at the outlet from said pump, said first valve means being manually operated and effective to regulate the pressure downstream from said first valve means at a substantially constant value determined by said manual operation, said second valve means being effective to vary the effective area of flow thru said second valve means from a predetermined maximum value to a predetermined minimum value greater than zero; said motor means including means to maintain said differential at a substantially constant predetermined value, whereby said pump outlet pressure varies as a function of the operation of said first and second valve means.

30. Fuel and speed control apparatus for an internal combustion engine having associated therewith a fuel pump for delivery of fuel thereto, comprising: a source of hydraulic fluid at substantially constant superatmospheric pressure, first and second conduits for the flow of fluid from said source, a thermal control responsive to the engine temperature and effective to control the pressure in a portion of said first conduit, first valve means in said second conduit responsive to said pressure in said portion of said first conduit and effective to control the pressure in a portion of said second conduit, and control means responsive to said pressure in said portion of said second conduit for controlling the delivery of said fuel pump, whereby the fuel flow to said engine is a function of said engine temperature.

31. Control apparatus for a pump, comprising: a source of hydraulic fluid at substantially constant superatmospheric pressure, first and second conduits for the flow of fluid from said source, first valve means for controlling a pressure in a portion of said first conduit, second valve means responsive to said controlled pressure in said first conduit portion for controlling the pressure in a portion of said second conduit, means responsive to said controlled pressure in said second conduit portion for maintaining a predetermined relationship between the pressure at the outlet from said pump and said controlled pressure in said second portion, whereby said pump outlet pressure varies as a function of said first valve means.

32. Control apparatus as set forth in claim 30, including manually operated means for varying the value of said superatmospheric pressure, and second and third valve means in said second conduit in series with said first valve means, said second and third valve means being responsive to the engine speed and an air pressure in said engine respectively and effective to modify said fluid pressure in said portion of said second conduit, whereby said fuel flow is also a function of said manually operated means, said speed, and said air pressure.

33. Control apparatus as set forth in claim 30, including second and third valve means in said second conduit in series with said first valve means, said second and third valve means being responsive to the engine speed and an air pressure in said engine respectively and effective to modify said fluid pressure in said portion of said second conduit, each of said first, said second, and said third valve means including a pair of ports in series in said second conduit, a rotating valve separating said ports and slidable therepast at right angles to the direction of said rotation, a circumferentially discontinuous relieved portion of said rotating valve having varying cross-sectional area for the flow of fluid between said ports past said rotating valve, said rotating valve being effective in response to continuous rotation thereof to intermit said flow and being also effective in response to said sliding motion to vary the effective area of said flow and hence to vary the fluid pressure downstream from said valve means, and driving means for continuously rotating each of said valves, the first, second, and third valves corresponding to said first, said second, and said third valve means being respectively responsive to said fluid pressure in said portion of said first conduit, the engine speed, and said engine air pressure, said first and second valve means being effective to decrease said fluid pressure in said portion of said second conduit when said temperature and said speed exceed predetermined values of temperature and speed respectively, said third valve means being effective to increase said fluid pressure in said portion of said second conduit as said air pressure increases, and first and second manually operated means for varying said superatmospheric fluid pressure and said predetermined value of speed respectively, whereby said fuel flow is also responsive to said two manually operated means, said speed and said engine air pressure.

34. Fuel and speed control apparatus for an internal combustion engine having associated therewith a fuel pump for delivery of fuel thereto, comprising: a source of hydraulic fluid at substantially constant superatmospheric pressure, a conduit for the flow of fluid from said source, valve means in said conduit responsive to at least one air pressure in said engine for controlling the fluid pressure in a portion of said conduit, control means responsive to said fluid pressure in said portion of said conduit for controlling the delivery of said fuel pump directly in accordance with said fluid pressure, whereby the fuel flow to said engine varies as a function of said engine air pressure and idle control means for maintaining said fluid pressure in said portion of said conduit above a predetermined value regardless of said engine air pressure.

35. Control apparatus as set forth in claim 34, in which said idle control means is responsive to atmospheric pressure, and manually operated means for overriding said valve means and said idle control means to increase the fluid pressure at the outlet from said fuel pump thruout a predetermined range of values independently of said fluid pressure in said portion of said conduit.

36. Control apparatus for a pump, comprising: a source of hydraulic fluid at substantially constant superatmospheric pressure, a conduit for the flow of fluid from said source, valve means for controlling the pressure in a portion of said conduit, first control means responsive to said controlled pressure for controlling the delivery of said pump directly in accordance with said controlled pressure, and second control means responsive to atmospheric pressure for maintaining said controlled pressure above a predetermined limiting value regardless of said valve means.

37. Fuel and speed control apparatus for an internal combustion engine having associated therewith a compressor and a fuel pump for delivery of air and fuel respectively thereto, and a manually operated engine control lever, comprising: a source of hydraulic fluid at substantially constant superatmospheric pressure, a conduit for the flow of fluid from said source, first adjusting means for determining the value of said superatmospheric pressure, first valve means responsive to an air pressure in said engine for controlling the fluid pressure in a portion of said conduit, second adjusting means for varying the response of said first valve means to said air pressure, an operating lever for simultaneously controlling said first and second adjusting means, a power amplifying mechanism including a cylinder having therein a pair of expansible chambers separated by a piston movable in said cylinder, said piston being responsive to the pressure differential between the respective pressures in said chambers and effective to control movement of said operating lever, conduit connections between said chambers and said fluid source for the flow of fluid from said source to said chambers, second valve means operated by said control lever for varying the flow in said conduit connections to vary said respective pressures, said second valve means having a neutral position thereof in respect to the position of said piston wherein the respective positions of said second valve means and said piston are in fixed relationship, said second valve means being effective upon movement from said neutral position to vary said respective pressures in a sense to operate said piston so as to maintain said neutral position of said second valve means whereby the corresponding respective positions of said control lever and said operating lever are in substantially constant relationship, and control means responsive to said fluid pressure in said portion of said conduit for controlling the delivery of said fuel pump.

38. Control apparatus as set forth in claim 37, including third and fourth valve means in series in said conduit with said first valve means for modifying said fluid pressure in a portion of said conduit, idle control means responsive to atmospheric pressure and effective to maintain the value of said fluid pressure in said portion of said conduit above a value determined by said atmospheric pressure, and a stop cock operable concurrently with said operating lever for cutting off the fuel flow to the engine when said control lever is in a preselected position.

39. Fuel and speed control apparatus for an internal combustion engine having associated therewith a fuel pump for delivery of fuel thereto, and a manually operated engine control lever, comprising: a source of hydraulic fluid at substantially constant superatmospheric pressure, a conduit for the flow of fluid from said source, first adjusting means for determining the value of said superatmospheric pressure, first valve means responsive to an air pressure in said engine for controlling the fluid pressure in a portion of said conduit, second adjusting means for varying the response of said first valve means to said operating condition, a shaft for simultaneous operation of said first and second adjusting means, delaying means responsive to said control lever for operating said shaft and effective to delay response of said shaft to movement of said control lever; said delaying means including a pair of bellows filled with fluid, a channel for the flow of said fluid between said bellows, a restriction in said channel for retarding said channel flow, cam means operated by said control lever for applying a load on one of said bellows, said shaft being operated by said one bellows, means controlling expansion and contraction of the other of said bellows, the respective pressures in said bellows becoming equal when the position of said cam means and said shaft are fixed, said shaft having a predetermined position corresponding to the position of said cam means when said respective pressures are equal, said delaying means being effective when said control lever operates to change the position of said cam means to cause inequality of said respective pressures in said bellows thereby causing flow from one of said bellows to the other until said respective pressures are equal; and control means responsive to said fluid pressure in said portion of said conduit for controlling the delivery of said pump; whereby the fuel flow to said engine is a function of said engine air pressure and movement of said lever and varies at a predetermined rate in response to movement of said lever.

40. Fuel and speed control apparatus for an internal combustion engine having associated therewith a fuel pump for delivery of fuel thereto, and a manually operated engine control lever, comprising: a source of hydraulic fluid at substantially constant superatmospheric pressure, a conduit for the flow of fluid from said source, first adjusting means for determining the value of said superatmospheric pressure, first valve means responsive to an air pressure in said engine for controlling the fluid pressure in a portion of said conduit, second adjusting means for varying the response of said first valve means to said air pressure, a shaft for simultaneous operation of said first and second adjusting means, delaying means responsive to said control lever for operating said shaft and effective to delay response of said shaft to movement of said control lever; and control means responsive to said fluid pressure in said portion of said conduit for controlling the delivery of said pump, whereby the fuel flow to said engine is a function of said engine air pressure and said lever varies at a predetermined rate in response to movement of said lever.

41. Control apparatus for a pump, comprising: a source of hydraulic fluid at substantially constant superatmospheric pressure, a conduit for the flow of fluid from said source, valve means for controlling the pressure in a portion of said conduit, adjusting means for operation of said valve means, a manually operated lever, connecting means for operation of said adjusting means by said lever, said connecting means including a device for delaying the response of said adjusting means to movement of said lever, and control means responsive to said pressure in said conduit portion for controlling the delivery of said pump, whereby said pump delivery varies as a function of said manually operated lever.

42. Control apparatus for a pump as set forth in claim 41, including first means for determining the value of said superatmospheric pressure, and second means for simultaneous operation of said adjusting means and said first means by said manually operated lever.

43. Fuel and speed control apparatus for an internal combustion engine having associated therewith a fuel pump for delivery of fuel thereto, and a manually operated engine control lever, comprising: a source of hydraulic fluid at substantially constant superatmospheric pressure, a conduit for the flow of fluid from said source, a device responsive to the engine speed, a governor spring for varying the response of said device to said speed, a valve operated by said device for controlling the pressure in a portion of said conduit, said valve being effective to decrease said pressure in said conduit portion when a value of speed pre-established by the deflection of said spring is exceeded, adjusting means for varying said spring deflection and hence said pre-established value of speed, delaying means responsive to movement of said control lever for operating said adjusting means, said delaying means being effective to delay the response of said adjusting means to said control lever movement a predetermined amount, and control means responsive to said pressure in said conduit portion for controlling the delivery of said pump.

44. Fuel and speed control apparatus for an internal combustion engine having associated therewith a compressor and a fuel pump for delivery of air and fuel respectively thereto, and a manually operated engine control lever, comprising: a reservoir of hydraulic fluid, a conduit for the flow of said fluid from said reservoir, an hydraulic pump for producing said flow, regulating means for regulating the pressure in a first portion of said conduit at a substantially constant pressure, adjusting means for determining the value of said substantially constant pressure, hydraulic motor means responsive to said control lever and effective to control said adjusting means; said motor means including a motor valve responsive to said control lever, a motor valve sleeve for operating said manually operated means, a pair of expansible chambers at the ends of said motor valve sleeve, a passage for the flow of fluid from the outlet of said fluid pump to said chambers and therefrom to said reservoir, said motor valve and said motor valve sleeve being effective to control said passage flow to regulate the respective pressures in said chambers, said motor valve sleeve being operable in response to the differential between said respective pressures, said motor valve and said motor valve sleeve having a neutral position in respect to each other and being effective to control said respective pressures in a sense to maintain said motor valve and said motor valve sleeve in said neutral position, whereby there is a predetermined positional relationship between said control lever and said manually operated means; valve means in said conduit responsive to the pressure differential across said compressor, said valve means including a rotating shaft having first, second, and third valves respectively thereon, said first valve being effective to control the flow in said passage downstream from said motor means to said reservoir, said second and said third valves being in series in said conduit for controlling the fluid pressure between said second and said third valves, and control means for maintaining the fluid pressure at the outlet of said fuel pump in pre-established relationship with said fluid pressure between said second and third valves.

45. Control apparatus for a pump having a manually operated control lever associated therewith, comprising: a source of hydraulic fluid at superatmospheric pressure, a first conduit for the flow of fluid from said source, a first valve for controlling the pressure in a portion of said first conduit; hydraulic motor means responsive to said control lever including a cylinder having a piston slidably operable therein, a first expansible chamber at one end of said piston and a second expansible chamber at the other end of said piston, said piston being responsive to the differential between the pressures in said first and second expansible chambers; adjusting means operated by said piston for controlling said first valve, a second conduit for supplying fluid from said source to said chambers, a third conduit for flowing fluid from said chambers, a second valve responsive to movement of said control lever for controlling the flow between said second and said third conduits to vary the respective pressures in said first and second chambers, port means in said cylinder and said piston and said second valve for providing a neutral position of said second valve in respect to the position of said piston wherein said respective pressures are constant and wherein said position of said piston is predetermined by said position of said second valve, said port means being effective upon movement of said valve in either direction from said neutral position to increase the pressure in one of said chambers and to decrease the pressure in the other of said chambers so that said piston moves in the same direction to restore said piston to a position corresponding to said neutral position, a third valve in said third conduit for controlling the flow therethru to regulate the rate of movement of said piston in said direction, and control means responsive to said pressure in said first conduit portion for controlling the delivery of said pump, whereby said pump delivery varies as a function of said adjusting means at a rate determined by said third valve.

46. Control apparatus as set forth in claim 45 wherein said third conduit is effective to convey fluid from one of said chambers so that said third valve is effective to control the rate of movement of said piston in one direction only, including a fourth conduit for flowing fluid from the other of said chambers, and a fourth valve in said fourth conduit for controlling the flow therethru to regulate the movement of said piston in the opposite direction, whereby said pump delivery increases at a rate determined by one of said third and fourth valves and decreases at a rate determined by the other of said third and fourth valves.

47. Control apparatus as set forth in claim 45 wherein said third conduit is effective to convey fluid from one of said chambers so that said third valve is effective to control the rate of movement of said piston in one direction only, including a fourth conduit for flowing fluid from the other of said chambers, a fourth valve in said fourth conduit for controlling the flow therethru to regulate the movement of said piston in the opposite direction, and means for varying the respective effective areas of flow thru said third and fourth valves to vary the respective rates of movement of said piston in said opposite directions, whereby the respective rates of said pump delivery increase and decrease are independently determined by said area varying means.

48. Fuel and speed control apparatus for an internal combustion engine having associated therewith a fuel pump for delivery of fuel thereto, and a manually operated engine control lever, comprising: a source of hydraulic fluid and a first conduit for the flow of said fluid therefrom, a fluid pump for producing said flow, means including a regulating valve for regulating a first pressure in a first portion of said first conduit at a substantially constant pressure, a first valve responsive to the engine speed for controlling a second pressure in a second portion of said first conduit, control means for maintaining the pressure at the outlet of said fuel pump in substantially constant proportional relationship with said second pressure, a second conduit for the flow of fuel from said fuel pump to said engine, and a stop cock operable by said control lever to vary the fuel flow in said second conduit from zero to a maximum value corresponding to the value of said second pressure.

49. Control apparatus as set forth in claim 48, including manually operated means responsive to said control lever for determining the value of said substantially constant pressure, a second stop cock operable by said control lever for overriding said control means to vary the pressure at the outlet from said fuel pump from a value corresponding to said second pressure to a maximum value corresponding to the maximum pressure transmittable by said fuel pump.

50. Control apparatus as set forth in claim 48, in which said first valve means is effective to decrease said second pressure when the engine speed exceeds a predetermined value, and including means for varying said predetermined value of speed and determining the value of said substantially constant pressure, a second valve in series with said first valve means in said first conduit responsive to the engine temperature for decreasing said second pressure when a pre-established value of temperature is exceeded, and motor means responsive to a first force manually applied to said control lever for operating said varying means with a second force in predetermined relationship with said first force.

51. Control apparatus as set forth in claim 48, in which said first valve means is effective to decrease said second pressure when the engine speed exceeds a predetermined value, and including means for varying said predetermined value of speed and determining the value of said substantially constant pressure, a second valve in series with said first valve means in said first conduit responsive to the engine temperature for decreasing said second pressure when a pre-established value of temperature is exceeded, a second stop cock operable by said control lever for overriding said control means to vary the pressure at the outlet from said fuel pump from a value corresponding to said second fluid pressure to a maximum value corresponding to the maximum pressure transmittable by said fuel pump, and a third valve responsive to an air pressure in said engine for increasing said second fluid pressure as said air pressure increases, and means for rotating at least one of said first, said second, said third, and said regulating valves to prevent sticking.

52. Control apparatus as set forth in claim 48, in which said idle control is responsive to the absolute atmospheric pressure, said first valve means is effective to decrease said second pressure when the engine speed exceeds a predetermined value, and including means for varying said predetermined value of speed and determining the value of said substantially constant pressure, a second valve in series with said first valve means in said first conduit responsive to the engine temperature for decreasing said second pressure when a pre-established value of temperature is exceeded, a second stop cock operable by said control lever for overriding said control means to vary the pressure at the outlet from said fuel pump from a value corresponding to said second pressure to a maximum value corresponding to the maximum pressure transmittable by said fuel pump, and a third valve responsive to an air pressure in said engine for increasing said second pressure as said air pressure increases, means for rotating all of said valves to prevent sticking, and motor means responsive to a first force manually applied to said control lever for operating said varying means with a second force in predetermined relationship with said first force.

53. Fuel and speed control apparatus for an internal combustion engine having associated therewith a compressor and a fuel pump for delivery of air and fuel respectively thereto, and a manually operated engine control lever, comprising: a source of hydraulic fluid and a first conduit for the flow of said fluid therefrom, a fluid pump for producing said flow, a regulating valve for regulating a first pressure in a first portion of said first conduit, a device responsive to the engine temperature, a mechanism in said first conduit downstream from said regulating means, said mechanism including a valve guide, a pair of ports in said valve guide in series in said first conduit, a valve slidably operable in said guide to vary the flow between said ports to control a second pressure in a second portion of said first conduit, and rotatable means responsive to said device for controlling the sliding movement of said valve; and control means for maintaining the pressure at the outlet of said fuel pump in substantially constant proportional relationship with said second pressure.

54. Fuel and speed control apparatus for an internal combustion engine having associated therewith a fuel pump for delivery of fuel thereto, comprising: a source of hydraulic fluid at substantially constant superatmospheric pressure and a first conduit for the flow of fluid therefrom, means responsive to an air pressure in said engine for controlling the fluid pressure in a portion of said first conduit, a second conduit for the flow of fuel from said fuel pump to said engine, said flow being a function of the fluid pressure in said second conduit, control means responsive to said fluid pressure in said portion of said first conduit for controlling said fluid pressure in said second conduit, and check valve means in said control means for retarding said response of said control means to said fluid pressure in said portion of said first conduit.

55. Control apparatus set forth in claim 48, including a second stop cock operable by said control lever for overriding said control means to vary the pressure at the outlet from said fuel pump from a value corresponding to said second fluid pressure to a maximum value corresponding to the maximum pressure transmittable by said fuel pump, and means rendering either of said two stop cocks ineffective when the other is effective to control said respective conditions in said second conduit.

56. Control apparatus for a pump, comprising: a source of hydraulic fluid and a first conduit for the flow of said fluid therefrom, means for producing said flow in said first conduit, regulating means for maintaining a first pressure in a first portion of said first conduit at a substantially constant pressure, valve means for controlling a second pressure in a second portion of said first conduit, control means for maintaining the pressure at the outlet of said fuel pump in substantially constant proportional relationship with said second pressure, a second conduit for flow therethru from said pump outlet, a first manually operated stop cock for varying the flow in said second conduit from zero to a maximum value corresponding to the value of said second pressure, and a second manually operated stop cock for overriding said control means to vary the pressure at said pump outlet from a value corresponding to said second pressure to a maximum value corresponding to the maximum pressure transmittable by said pump.

57. Fuel and speed control apparatus for an internal combustion engine having associated therewith a fuel pump for delivery of fuel thereto, comprising: a source of hydraulic fluid at substantially constant superatmospheric pressure and a first conduit for the flow of fluid therefrom, a governor valve in said conduit for controlling the pressure in a portion thereof between maximum and minimum values corresponding to predetermined extreme positions of said valve, a device responsive to the engine speed for operating said governor valve, a spring opposing movement of said device to determine the respective values of speed corresponding to said predetermined positions of said valve, manually operated means for controlling the deflection of said spring to vary said respective values of speed, a first adjustable stop for limiting movement of said valve in a closing direction to determine said minimum pressure value, a second adjustable stop for determining the minimum deflection of said spring, a third adjustable stop for determining the maximum deflection of said spring, and control means responsive to said pressure in said conduit portion for controlling the delivery of said pump.

58. Control apparatus as set forth in claim 57 having a casing for enclosure of said apparatus, and a removable plug in said casing for rendering said first, said second, and said third adjustable stops accessible from outside said casing.

59. Fuel and speed control apparatus for an internal combustion engine having associated therewith a compressor and a fuel pump for delivery of air and fuel respectively thereto, said pump having delivery varying means connected thereto, comprising: a source of hydraulic fluid at substantially constant superatmospheric pressure, a conduit for the flow of fluid from said source, a channel for the flow of air from the outlet to the inlet of said compressor, a first valve for controlling said flow in said channel to regulate an air pressure in a portion of said channel, valve means including at least one valve in said conduit for controlling the flow in said conduit to regulate a fluid pressure in a portion of said conduit, and motor means having a piston included therein for controlling said delivery varying means.

60. Control apparatus for a pump comprising: a source of hydraulic fluid at substantially constant superatmospheric pressure, a conduit for the flow of fluid from said source, a first valve in said conduit for regulating a pressure in a portion thereof at a substantially constant value, second and third valves in series in said conduit for controlling a pressure in a second portion thereof, a rotating shaft for rotation of said first, said second, and said third valves to prevent sticking, and control means responsive to said pressure in said conduit portion for varying the pressure at the outlet of said pump as a function of said pressure in said second portion of said conduit.

61. Fuel and speed control apparatus for an internal combustion engine having a pump associated therewith for supplying fuel thereto and means for varying the delivery of said pump, comprising: a source of hydraulic fluid at superatmospheric pressure, a conduit for flowing fluid from said source, a valve in said conduit for controlling the flow therethru to regulate the pressure in a portion thereof, said delivery varying means being responsive to said regulated pressure, a device responsive to the engine speed and effective when said engine speed exceeds a predetermined value to operate said valve in a sense to decrease said fuel flow and hence said engine speed, and an adjustable stop for limiting movement of said valve in a fuel decreasing sense to prevent shutting off said fuel flow.

62. Control apparatus for an internal combustion engine, comprising means for controlling the supply of fuel to said engine, motor means, driven by a fluid pressure from a source separate from said fuel supply, for operating said fuel supply control means, an acceleration control for limiting the speed of said motor means to control acceleration of said engine, under all engine operating conditions, and means responsive to the direction of operation of said motor means to render said acceleration control ineffective when said motor means moves in a fuel supply decreasing direction.

63. Fuel and speed control apparatus for an internal combustion engine having an air compressor for delivering compressed air thereto and a fuel pump with means for varying its delivery of fuel to said engine, comprising: a source of hydraulic fluid under a superatmospheric pressure separate from said fuel, an hydraulic motor operatively connected to said fuel delivery varying means, a conduit connecting said source to said motor; and means for regulating the fluid pressure in said conduit in accordance with the engine speed and an air pressure differential across said compressor, whereby the fuel delivery of said pump is regulated in accordance with said engine speed and air pressure differential.

64. Control apparatus according to claim 63, which includes a manual control means for controlling the operation of said fluid pressure regulating means so that the fuel delivery of said pump is regulated in accordance with said engine speed and air pressure and the position of said manual control means.

65. Fuel and speed control apparatus for an internal combustion engine having a fuel pump with means for varying its delivery of fuel to said engine, comprising: a source of hydraulic fluid under a superatmospheric pressure, an hydraulic motor operatively connected to said fuel delivery varying means, a conduit connecting said source to said motor; first valve means in said conduit, responsive to the speed of said engine, for regulating the fluid pressure in said conduit downstream from said valve means; and second valve means in said conduit in series with said first valve means and responsive to an air pressure in said engine, for regulating the pressure in said conduit downstream from said second valve means; whereby the fuel delivery of said pump is regulated in accordance with said engine speed and air pressure.

66. Control apparatus according to claim 63, which includes means for modifying the action of said fluid pressure regulating means in accordance with the temperature of said engine, whereby the fuel delivery of said pump is regulated in accordance with said engine speed, air pressure and temperature.

67. Control apparatus according to claim 63, which includes means for maintaining the fluid pressure in said conduit upstream from said fluid pressure regulating means at a substantially constant pressure.

68. Control apparatus according to claim 65, wherein said first valve means is upstream from said second valve means.

69. Control apparatus according to claim 65, which includes means for continuously rotating said first and second valve means during operation of the engine.

70. Control apparatus according to claim 65, wherein said valve means are adapted to permit a restricted flow of fluid at all times during the operation of said control apparatus.

71. Control apparatus according to claim 65, wherein said first valve means includes adjustable stop means for limiting the range of operation of said first valve means to control idling fuel flow at a predetermined limiting value.

72. Control apparatus according to claim 65, which includes a manual control means operatively connected to adjustable means associated with said first valve means for modifying its operation, whereby the operation of said first valve means is modified in accordance with the position of said manual means.

73. Control apparatus according to claim 65, which includes third valve means for maintaining the fluid pressure in said conduit upstream from said first and second valve means at a substantially constant pressure.

74. Control apparatus according to claim 73, which includes means for continuously rotating said first, second and third valve means during operation of the engine.

75. Control apparatus according to claim 73, which includes a manual control means operatively connected to an adjustable means associated with said third valve means for modifying its operation, whereby the operation of said third valve means is modified in accordance with the position of said manual means.

76. Control apparatus according to claim 73, which includes a manual control means operatively connected to a separate adjustable means operatively associated with said first and third valve means respectively for modifying the operation of said first and third valve means, whereby the operations of said first and third valve means are simultaneously modified in accordance with the position of said manual means.

77. Fuel and speed control apparatus for an internal combustion engine having an air compressor for delivering compressed air thereto and a variable capacity fuel pump having means for varying its delivery of fuel to said engine, comprising: an hydraulic motor operatively connected to said fuel delivery varying means; means for supplying hydraulic fluid separate from said fuel to said motor under a regulated pressure, and means for regulating said pressure in accordance with engine speed and air pressure differential across said compressor, whereby the fuel delivery of said pump is regulated in accordance with said engine speed and air pressure differential.

78. Control apparatus according to claim 77, which includes means for supplying to said motor fuel, at the discharge pressure of said pump, which opposes the pressure of the hydraulic fluid supplied to said pump, whereby the operation of said motor is balanced by the discharge pressure of said pump.

79. Control apparatus according to claim 77, which includes a manual control means adapted to modify the regulated pressure of the hydraulic fluid supplied to said motor, whereby the fuel delivery of said pump is regulated in accordance with said engine speed and air pressure and the position of said manual control means.

LEIGHTON LEE II.

References Cited in the file of this patent

UNITED STATES PATENTS

| Number | Name | Date |
| --- | --- | --- |
| 1,066,189 | Eberman | July 1, 1913 |
| 1,564,215 | Dillig | Dec. 8, 1925 |
| 1,922,834 | Albright | Aug. 15, 1933 |
| 1,967,851 | Wilson | July 24, 1934 |
| 2,049,233 | Thomas | July 28, 1936 |
| 2,219,994 | Jung | Oct. 29, 1940 |
| 2,231,696 | Wolfe | Feb. 11, 1941 |
| 2,245,562 | Becker | June 17, 1941 |
| 2,251,618 | Rogers | Aug. 5, 1941 |
| 2,263,705 | Seippel | Nov. 25, 1941 |

(Other references on following page)

UNITED STATES PATENTS

| Number | Name | Date |
|---|---|---|
| 2,296,876 | Samiran et al. | Sept. 29, 1942 |
| 2,304,784 | Donaldson | Dec. 15, 1942 |
| 2,385,784 | Baker | Oct. 2, 1945 |
| 2,397,213 | Smith | Mar. 26, 1946 |
| 2,403,371 | Ifield et al. | July 2, 1946 |
| 2,405,888 | Holley | Aug. 13, 1946 |
| 2,410,773 | Chandler | Nov. 5, 1946 |
| 2,424,035 | Ifield | July 15, 1947 |
| 2,429,005 | Watson et al. | Oct. 14, 1947 |
| 2,440,663 | Ifield | Apr. 27, 1948 |
| 2,457,595 | Orr | Dec. 28, 1948 |
| 2,489,586 | Ray | Nov. 29, 1949 |
| 2,538,605 | Udale | Jan. 16, 1951 |
| 2,570,591 | Price | Oct. 9, 1951 |
| 2,581,276 | Mock | Jan. 1, 1952 |

FOREIGN PATENTS

| Number | Country | Date |
|---|---|---|
| 490,978 | Great Britain | Aug. 24, 1938 |
| 493,174 | Great Britain | Oct. 4, 1938 |